(12) United States Patent
Hamada

(10) Patent No.: US 9,215,347 B2
(45) Date of Patent: Dec. 15, 2015

(54) INFORMATION PROCESSING SYSTEM AND PROGRAM

(75) Inventor: Yoshinobu Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/918,881

(22) PCT Filed: Jul. 14, 2010

(86) PCT No.: PCT/JP2010/062278
§ 371 (c)(1),
(2), (4) Date: Aug. 23, 2010

(87) PCT Pub. No.: WO2011/016338
PCT Pub. Date: Feb. 10, 2011

(65) Prior Publication Data
US 2011/0179466 A1 Jul. 21, 2011

(30) Foreign Application Priority Data
Aug. 5, 2009 (JP) .................................. 2009-182894

(51) Int. Cl.
*H04L 29/06* (2006.01)
*H04N 1/44* (2006.01)
*H04N 1/00* (2006.01)

(52) U.S. Cl.
CPC ......... *H04N 1/4413* (2013.01); *H04N 1/00464* (2013.01); *H04N 1/00474* (2013.01); *H04N 1/00482* (2013.01); *H04N 1/4426* (2013.01); *H04N 2201/0018* (2013.01)

(58) Field of Classification Search
None
See application file for complete search history.

(56) References Cited

U.S. PATENT DOCUMENTS

| 6,334,161 | B1 * | 12/2001 | Suzuki et al. .................... 710/29 |
| 6,457,079 | B1 * | 9/2002 | Hanaoka et al. ............... 710/105 |
| 7,616,953 | B2 * | 11/2009 | Hu et al. ..................... 455/432.1 |
| 8,238,908 | B2 * | 8/2012 | Wu et al. ..................... 455/435.1 |
| 2006/0218628 | A1 * | 9/2006 | Hinton et al. ...................... 726/8 |
| 2008/0074693 | A1 * | 3/2008 | Hashimoto et al. .......... 358/1.15 |
| 2008/0201771 | A1 * | 8/2008 | Ueda ................................. 726/7 |
| 2009/0164927 | A1 | 6/2009 | Nakahara |

FOREIGN PATENT DOCUMENTS

| JP | 2006031064 A | 2/2002 |
| JP | 2005-346356 A | 12/2005 |
| JP | 2008083809 A | 4/2008 |
| JP | 2008-250219 A | 10/2008 |
| JP | 2009032192 A | 2/2009 |
| JP | 2009143083 A | 7/2009 |
| JP | 2009152847 A | 7/2009 |

* cited by examiner

*Primary Examiner* — Kaveh Abrishamkar
(74) *Attorney, Agent, or Firm* — Fitzpatrick, Cella, Harper & Scinto

(57) ABSTRACT

An information processing system is provided that simplifies a logout procedure in an information processing apparatus that has a Web browser that operates together with a Web server that serves as an external apparatus, while maintaining the operational feel of the Web browser. To accomplish this, in the present information processing system, the Web server is notified of a user instruction input via an operation screen of the Web browser provided from the Web server as an event. Here, the Web server analyzes the notified event, and if this event is a logout request, the Web server executes processing for logging out of the Web server, and also notifies the Web browser of the logout request. The Web browser executes processing for logging out of the Web browser upon receipt of the logout request from the Web server.

7 Claims, 28 Drawing Sheets

F I G. 5
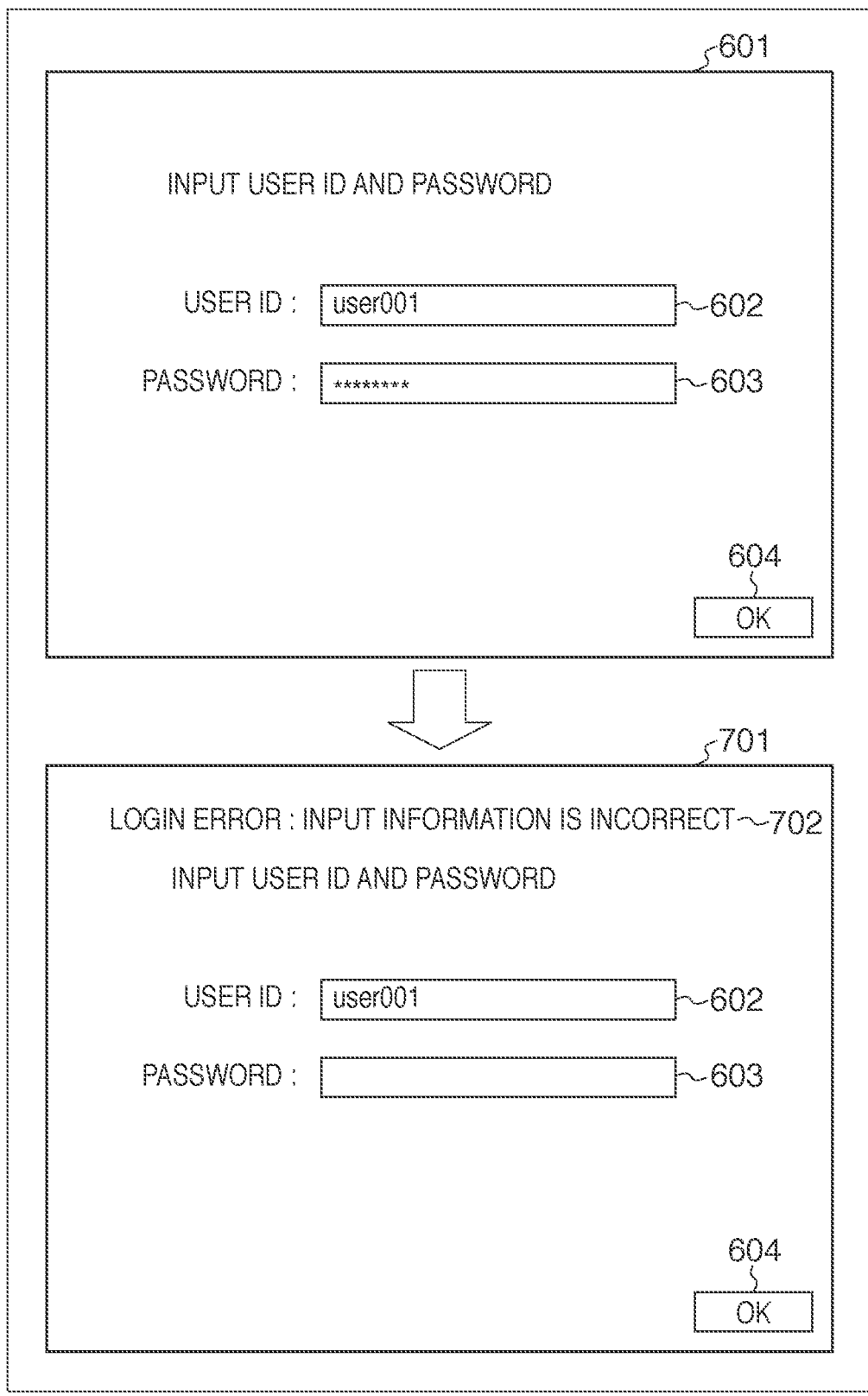

F I G. 10B
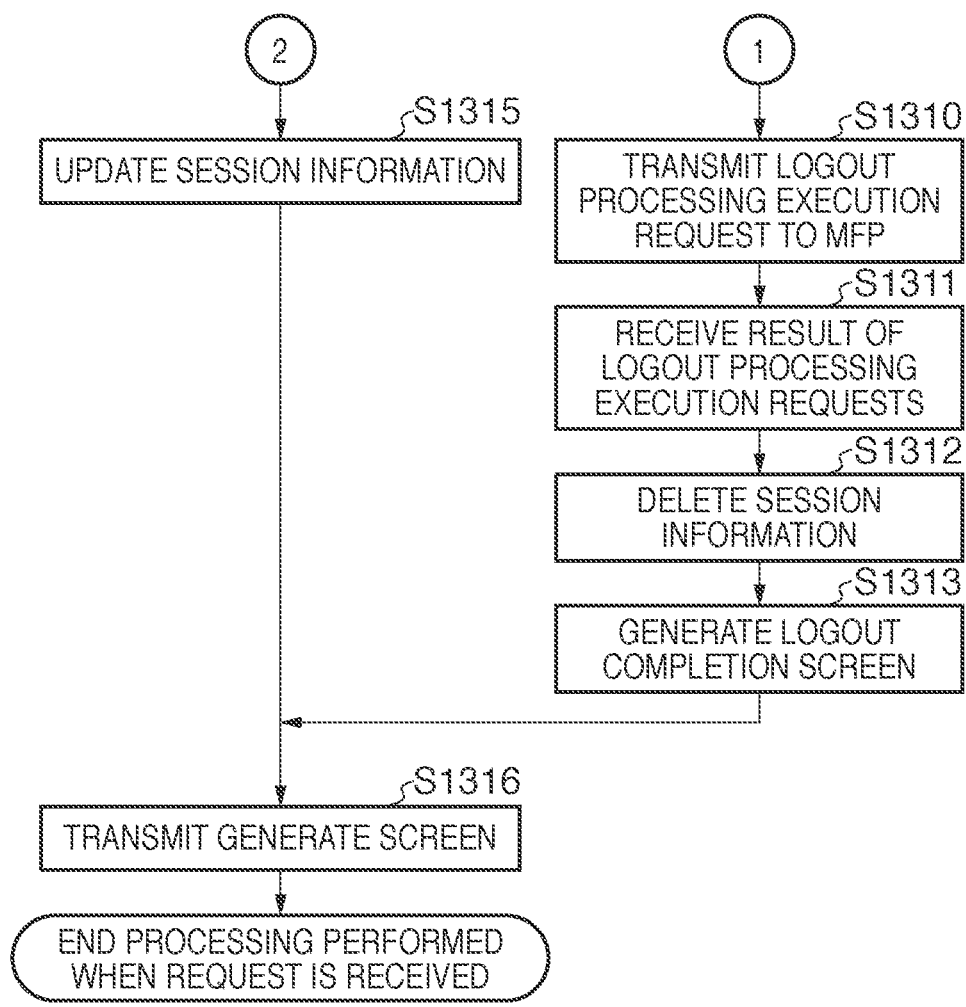

FIG. 15

```
┌─────────────────────────────────────────────────┐ ─2001
│ ■ MFP LOGOUT CONFIRMATION                       │
│                                                 │
│   YOU WILL BE LOGGED OUT OF THE WEB APPLICATION.│
│   DO YOU ALSO WANT TO LOG OUT OF THE MFP?       │
│                                                 │
│                                                 │
│      ┌─────────┐        ┌─────────┐             │
│      │   YES   │        │   NO    │             │
│      └─────────┘        └─────────┘             │
│          2002              2003                 │
│                                                 │
└─────────────────────────────────────────────────┘
```

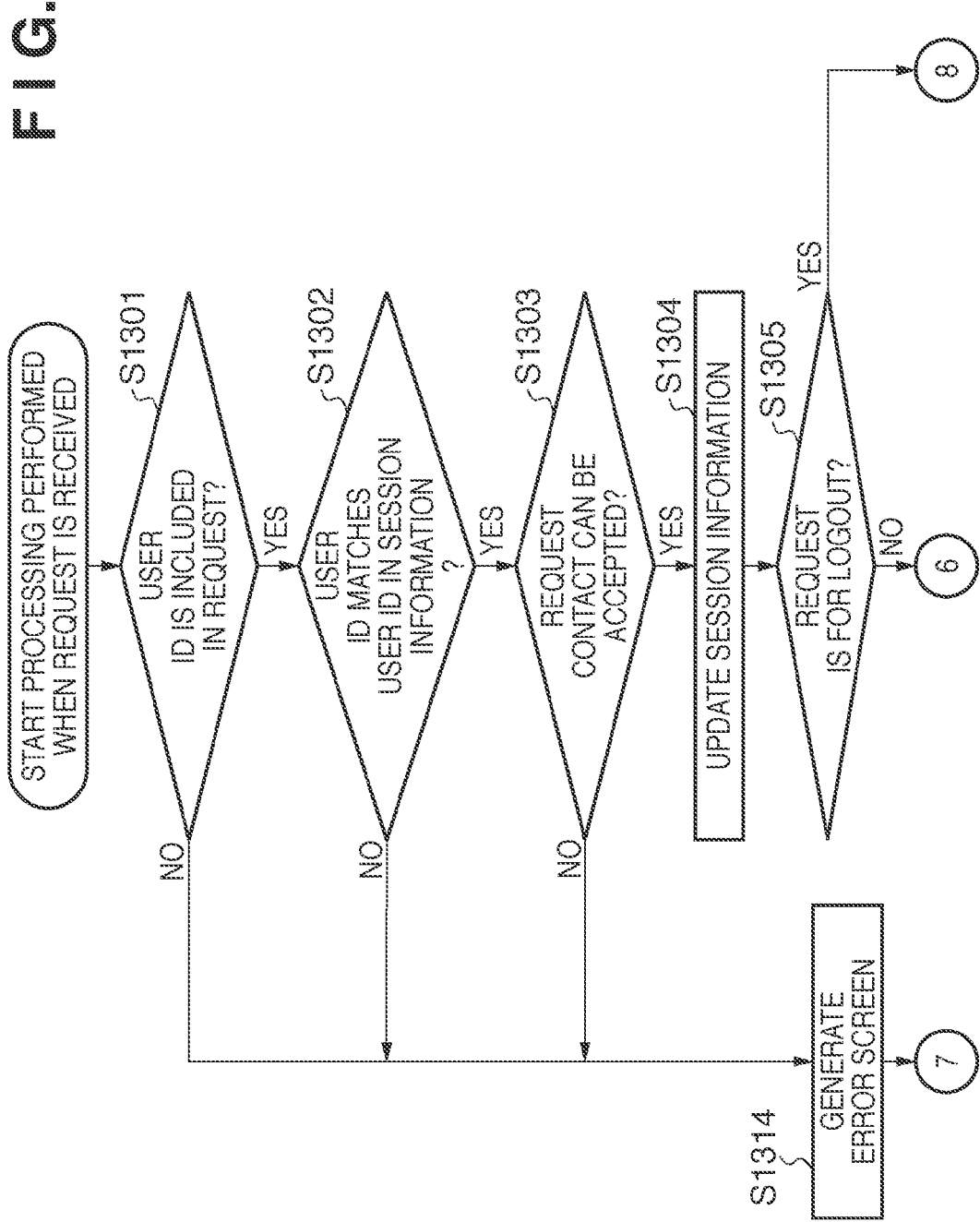

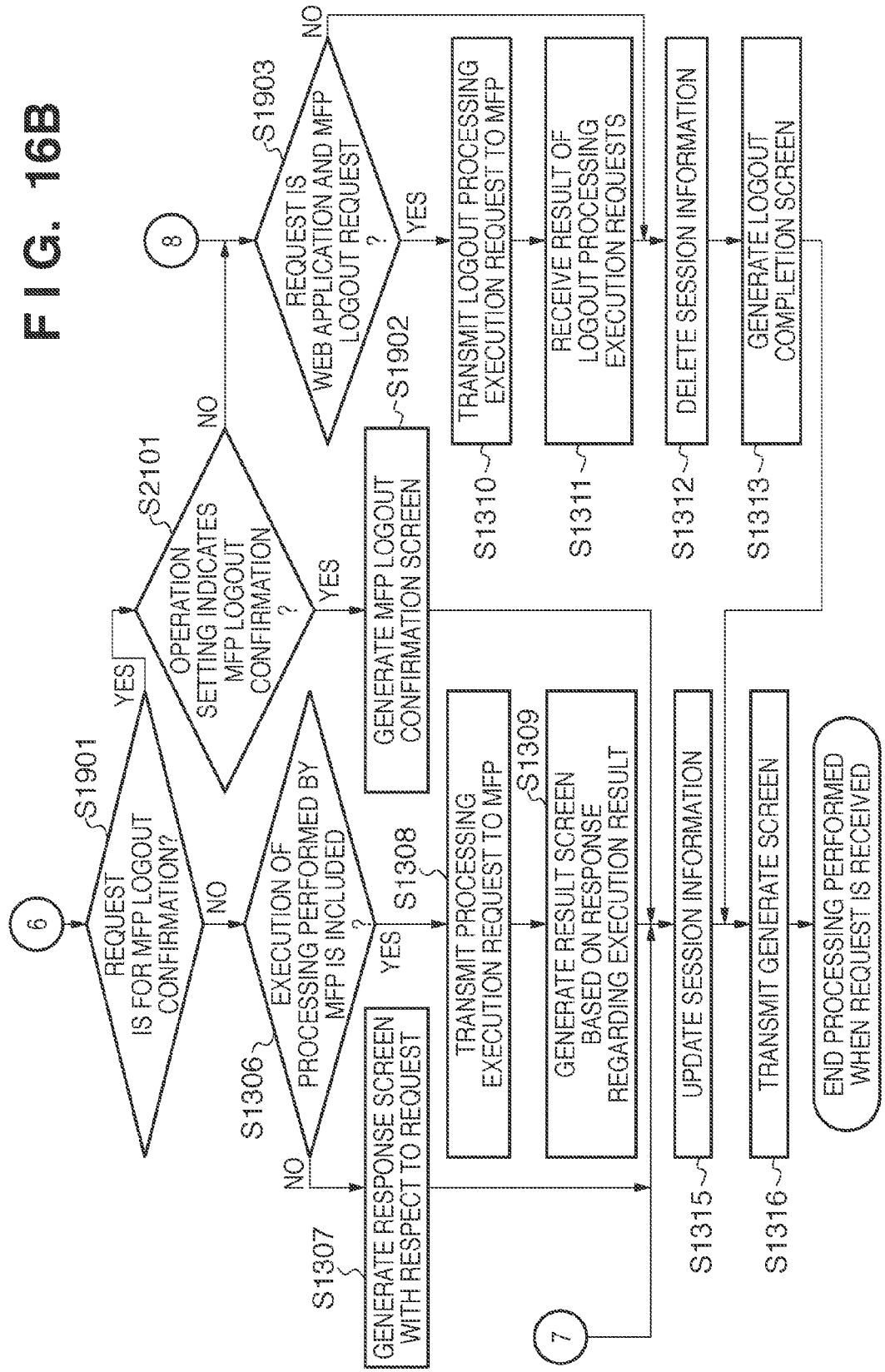

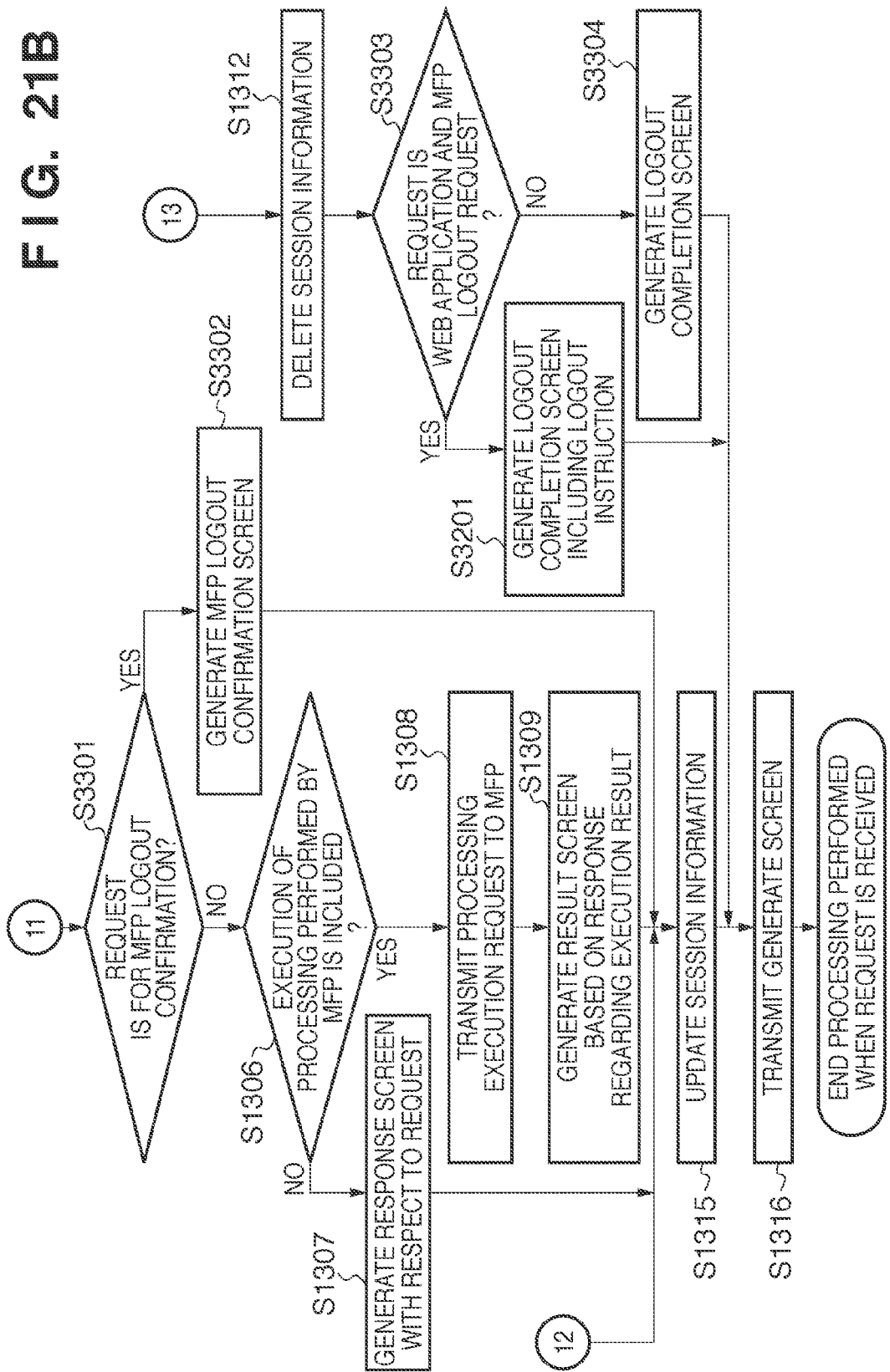

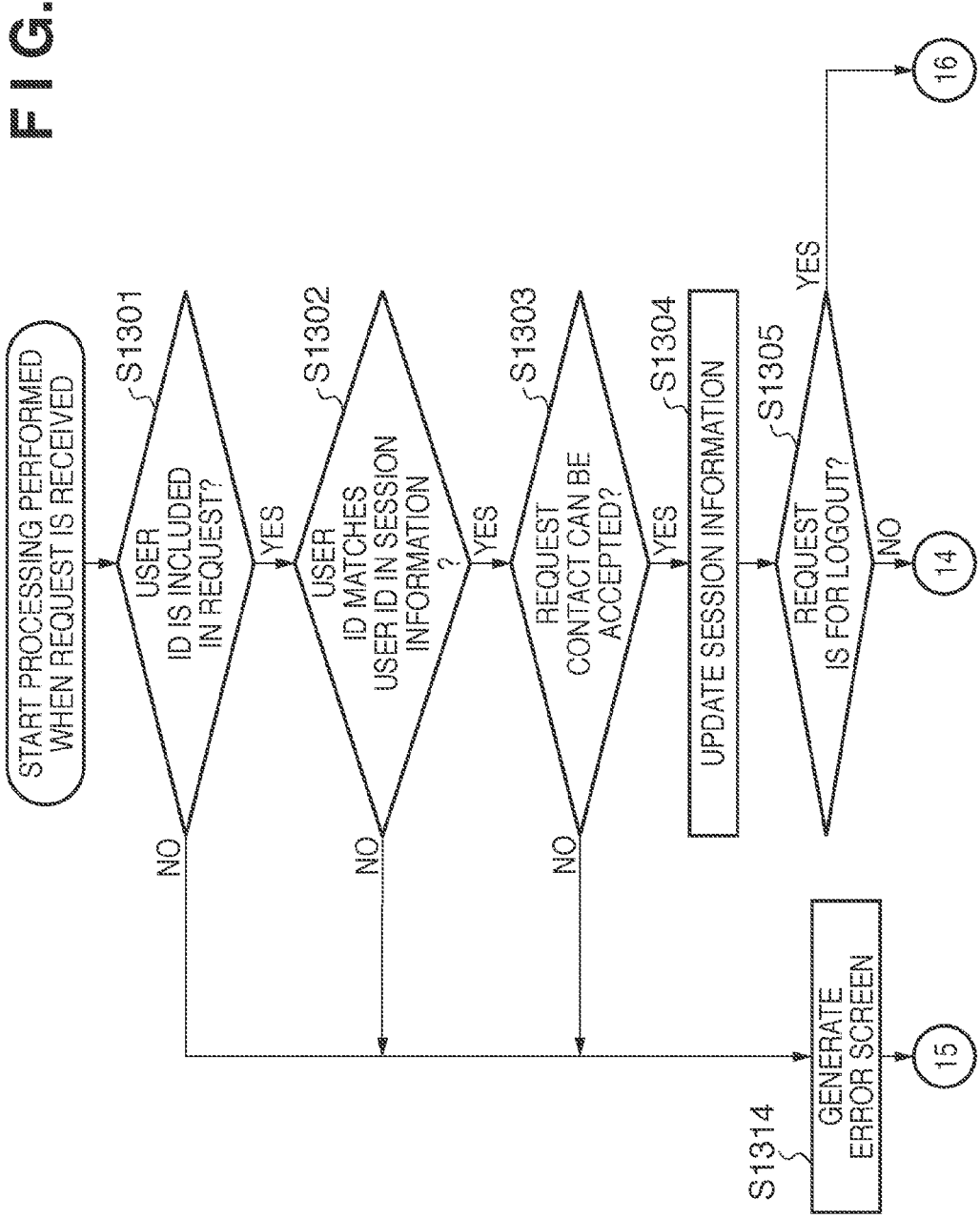

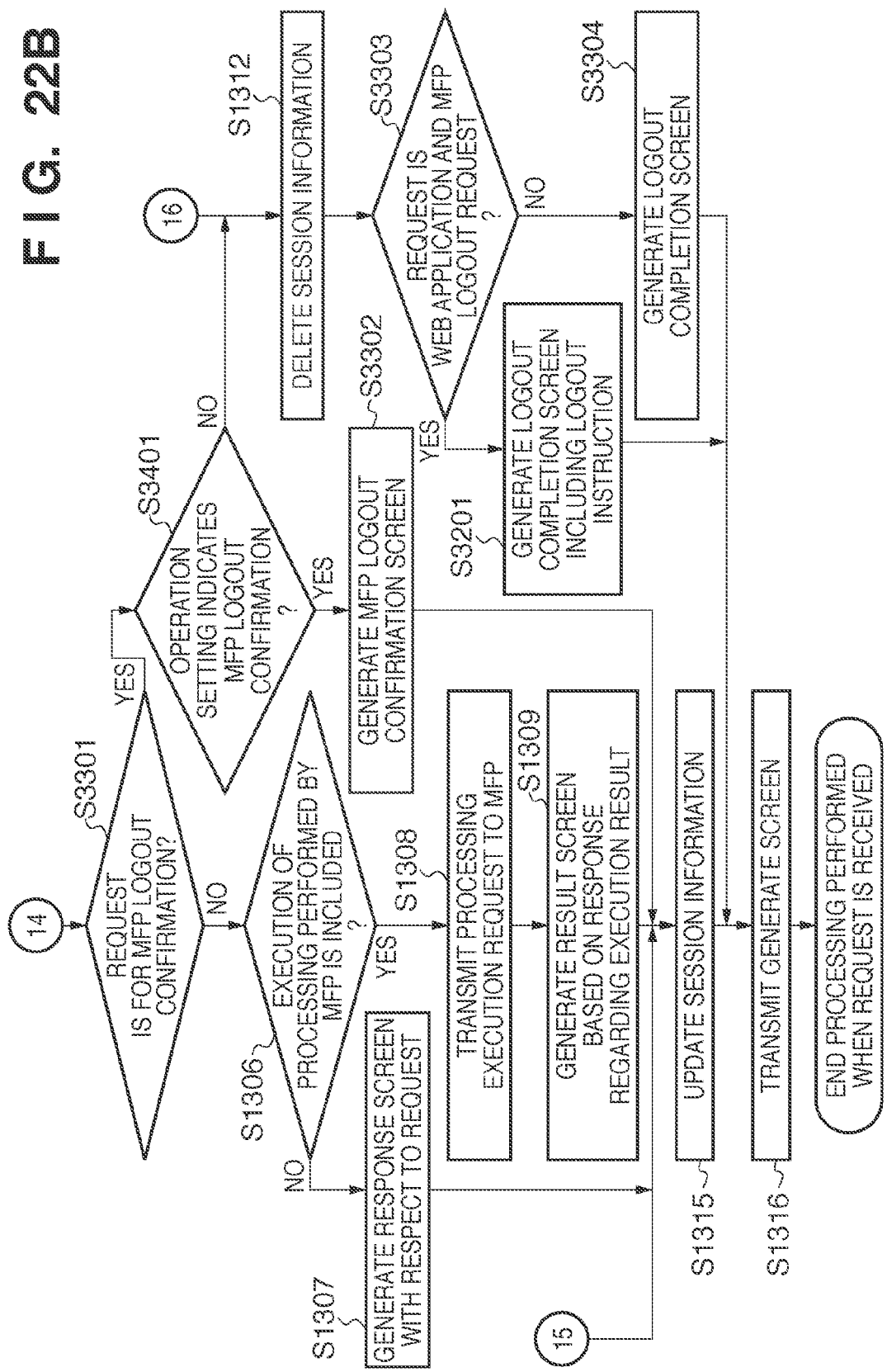

INFORMATION PROCESSING SYSTEM AND PROGRAM

TECHNICAL FIELD

The present invention relates to an information processing system including a server and an information processing apparatus that has a browser for displaying an operation screen provided by the server, a control method for the same, and a program.

BACKGROUND ART

In recent years, an image forming apparatus that is called an MFP (multifunction peripheral) and which is provided with printer and scanner functions, includes a Web browser, and directly accesses a Web server without the intervention of a PC (personal computer). Accordingly, the MFP can print Web content, and operate a Web application.

Further, regarding such an MFP provided with a Web browser, a system has been proposed that has a configuration in which an operation screen for executing functions that the MFP originally has is provided from an external Web server, and the operation screen is operated via the Web browser. In such a system, a user of the MFP inputs instructions to the MFP via the operation screen displayed via the Web browser, and the inputted instructions are transmitted to the Web server by the Web browser of the MFP. The Web server that has received the instructions requests the MFP to execute various processing in accordance with the content of the instructions inputted by the user. Then, the MFP that has received such a request executes the requested processing. Thereby, it is not necessary to hold, in the MFP, the entire operation screen information for operating the MFP, and it is also possible to make a change to the operation screen in the Web server using a similar method to a general method for making a change to a Web application.

However, in such a system, in order for both the MFP and the Web server to manage the login states of the user, the user had to perform operations for logging into and logging out of both the MFP and the Web server. Meanwhile, Japanese Patent Laid-Open No. 2008-83809 has proposed a configuration in which, in an MFP provided with a Web browser, login information is transmitted to a specific Web server when logging into the MFP, and logout information is transmitted to that Web server when logging out of the MFP.

However, with the above conventional technique, even if a logout operation button is displayed via the Web browser in the operation screen provided by the Web server, a logout request is merely transmitted to the Web server, and logging out of the MFP is not performed. Accordingly, it has been necessary to log out of the MFP separately, resulting in a problem in that the user has to perform an additional time-consuming operation.

On the other hand, with the technique disclosed in Japanese Patent Laid-Open No. 2008-83809, the user can log out of both the MFP and the Web server by logging out of the MFP by operating a hard key for logout. However, since the user is operating a screen displayed via the Web browser, there is a demand for also giving a logout instruction on the screen of the Web browser. That is, operations cannot be performed serially using the Web browser, and thus there has been the problem of causing the user to perform troublesome operations.

SUMMARY OF INVENTION

The present invention enables realization of an information processing system that simplifies a logout procedure in an information processing apparatus that has a Web browser that operates in cooperation with a Web server that serves as an external apparatus, while maintaining the operational feel of the Web browser, a control method for the same, and a program.

One aspect of the present invention provides an information processing system comprising an external apparatus having a server function and an information processing apparatus having a browser function, the information processing apparatus comprising: event notification means for analyzing an event that indicates a user instruction inputted via an operation screen provided from the external apparatus, and notifying the external apparatus of the event; and first logout means for executing processing for logging out of the information processing apparatus upon receipt of a logout request from the external apparatus, and the external apparatus comprising: determination means for analyzing the event notified from the information processing apparatus, and determining whether or not the event is a logout request; logout notification means for, if the event is the logout request, notifying the information processing apparatus of the logout request; and second logout means for, when the logout request has been notified, executing processing for logging out of the external apparatus.

Another aspect of the present invention provides an information processing system comprising an external apparatus having a server function and an information processing apparatus having a browser function, the information processing apparatus comprising: determination means for analyzing an event that indicates a user instruction inputted via an operation screen provided from the external apparatus, and determining whether or not the event is a logout request; logout notification means for, if the event is the logout request, notifying the external apparatus of the logout request; and first logout means for, if the event is the logout request, executing processing for logging out of the information processing apparatus, and the external apparatus comprising: second logout means for, upon receipt of the logout request from the information processing apparatus, executing processing for logging out of the external apparatus.

Still another aspect of the present invention provides an information processing system comprising an external apparatus having a server function and an information processing apparatus having a browser function, the information processing apparatus comprising: event notification means for notifying the external apparatus of an event that indicates a user instruction inputted via an operation screen provided from the external apparatus; first determination means for, by interpreting a description included in a response, from the external apparatus, to the notification of the event, determining whether or not a logout request is included in the response; and first logout means for executing processing for logging out of the information processing apparatus if the logout request is included in the response, and the external apparatus comprising: second determination means for analyzing the event notified from the information processing apparatus, and determining whether or not the event is a logout request; second logout means for, if the event is the logout request, executing processing for logging out of the external apparatus; and response means for, when processing for logging out of the external apparatus is complete, appending a description of the logout request to the response to the event, and notifying the resultant response.

Yet still another aspect of the present invention provides a control method for an information processing system comprising an external apparatus having a server function and an information processing apparatus having a browser function, the control method comprising: the information processing apparatus analyzing an event that indicates a user instruction inputted via an operation screen provided from the external apparatus, and notifying the external apparatus of the event, and executing processing for logging out of the information processing apparatus upon receipt of a logout request from the external apparatus, and the external apparatus analyzing the event notified from the information processing apparatus, and determining whether or not the event is a logout request, notifying, if the event is the logout request, the information processing apparatus of the logout request, and executing, when the logout request has been notified, processing for logging out of the external apparatus.

Still yet another aspect of the present invention provides a control method for an information processing system comprising an external apparatus having a server function and an information processing apparatus having a browser function, the control method comprising: the information processing apparatus analyzing an event that indicates a user instruction inputted via an operation screen provided from the external apparatus, and determining whether or not the event is a logout request, notifying, if the event is the logout request, the external apparatus of the logout request, and executing, if the event is the logout request, processing for logging out of the information processing apparatus, and the external apparatus executing, upon receipt of the logout request from the information processing apparatus, processing for logging out of the external apparatus.

Yet still another aspect of the present invention provides a control method for an information processing system comprising an external apparatus having a server function and an information processing apparatus having a browser function, the control method comprising: the information processing apparatus notifying the external apparatus of an event that indicates a user instruction inputted via an operation screen provided from the external apparatus, determining by interpreting a description included in a response, from the external apparatus, to the notification of the event, whether or not a logout request is included in the response, and executing processing for logging out of the information processing apparatus if the logout request is included in the response, and the external apparatus analyzing the event notified from the information processing apparatus, and determining whether or not the event is a logout request, executing, if the event is the logout request, processing for logging out of the external apparatus, and appending, when processing for logging out of the external apparatus is complete, a description of the logout request to the response to the event, and notifying the resultant response.

Still yet another aspect of the present invention provides a computer-readable storage medium storing a computer program for causing a computer to execute the control method for the information processing system.

Further features of the present invention will be apparent from the following description of exemplary embodiments with reference to the attached drawings.

BRIEF DESCRIPTION OF DRAWINGS

FIG. 5 is a diagram showing examples of a login screen and a login error screen.
FIGS. 10A and 10B are a flowchart showing a processing procedure performed by the Web application 410 according to the first embodiment.
FIG. 15 is a diagram showing an example of an MFP logout confirmation screen according to the second embodiment.
FIGS. 16A and 16B are a flowchart showing a processing procedure performed by the Web application 410 at the time of logout, according to a third embodiment.
FIGS. 21A and 21B are a flowchart showing a processing procedure performed by the Web application 410 when an event is generated, according to a modified example of the fifth embodiment.
FIGS. 22A and 22B are a flowchart showing a processing procedure performed by the Web application 410 when an event is generated, according to a modified example of the fifth embodiment.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Information Processing System

Figure 1:
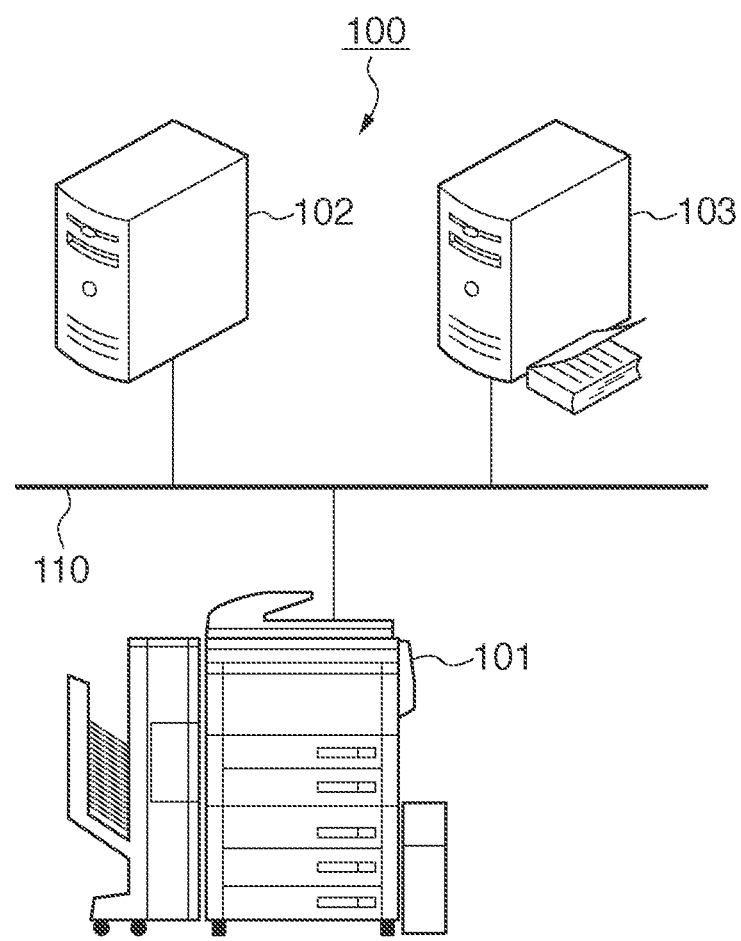
FIG. 1 is a diagram showing an information processing system 100 according to a first embodiment.

First, a first embodiment according to the present invention is described. First, an example of the configuration of an information processing system 100 according to the present embodiment is described with reference to FIG. 1. The information processing system 100 includes an MFP 101, a Web server 102, and an LDAP (Lightweight Directory Access Protocol) server 103. A network 110 is a LAN (Local Area Network), the Internet, or the like, and the MFP 101, the Web server 102, and the LDAP server 103 are connected thereto. Note that a document management apparatus for saving/managing electronic documents, a mail server for transmitting and receiving electronic mails, a PC, and the like may be connected to the information processing system 100. The MFP 101 is an example of an information processing apparatus, and has a plurality of functions such as a print function, a copy function, a scanner function, a transmission function, and a Web browser function. The Web server 102 is an example of an external apparatus, and is a personal computer that has a Web server function. The LDAP server 103 is an example of a management server, holds user authentication information (identifiers), performs user authentication with respect to an inquiry from the MFP 101 or the like, and transmits the result. Note that details of the apparatuses are described later.

Control Configuration of Information Processing System

Figure 2:
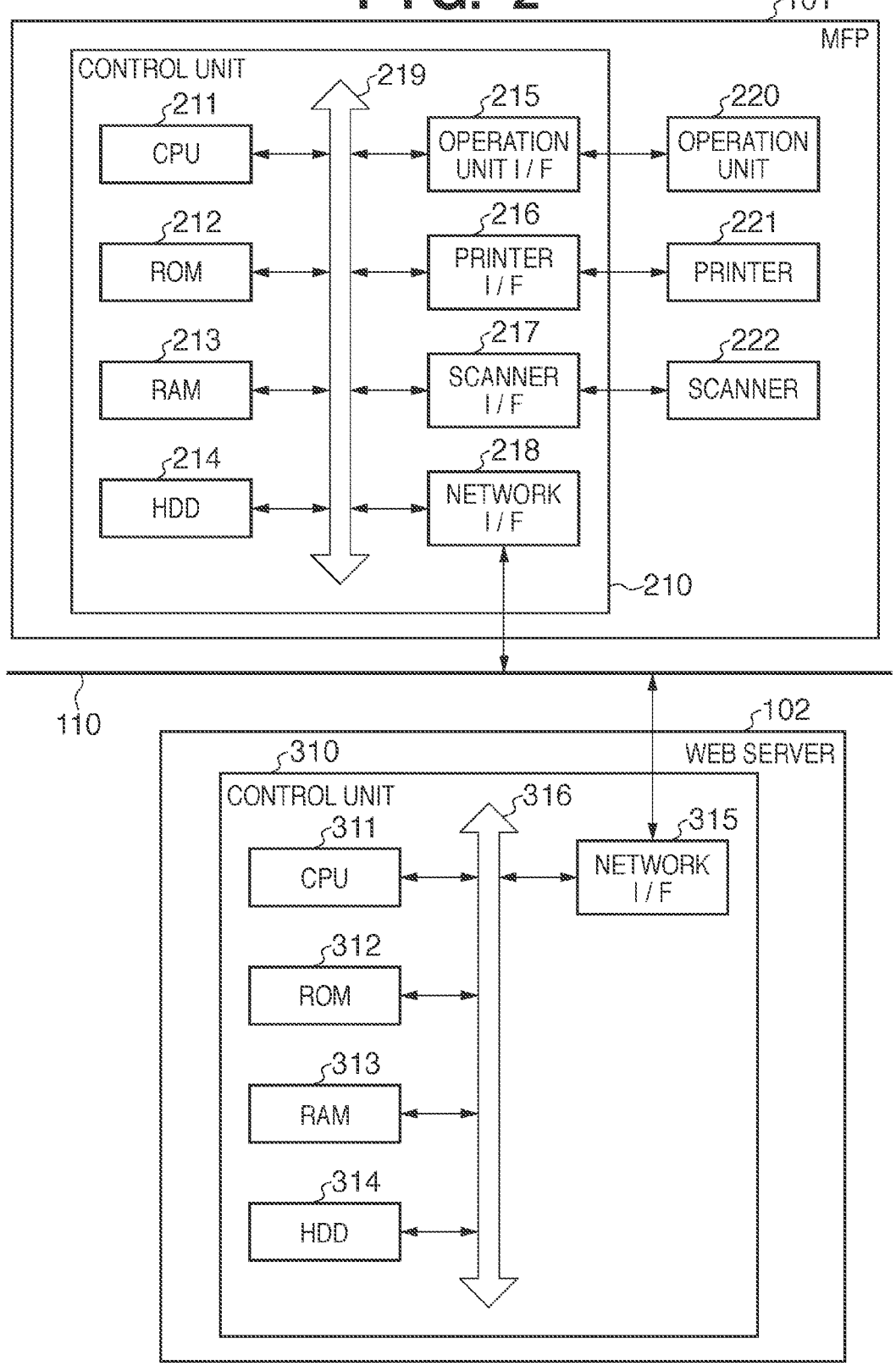
FIG. 2 is a diagram showing the control configuration of the information processing system 100 according to the first embodiment.

Next, an example of the control configuration of the information processing system 100 according to the present embodiment is described with reference to FIG. 2. Here, the control configurations of the MFP 101 and the Web server 102 are described. Note that the control configuration of the LDAP server 103 is the same as the control configuration of the Web server 102, and thus a description thereof is omitted.

First, the control configuration of the MFP 101 is described. A control unit 210 including a CPU 211 performs overall control of the operation of the MFP 101. Note that reference numeral 219 denotes a bus that connects blocks in the control unit 210. The CPU 211 reads out a control program stored in a ROM 212, and executes various control processing, such as reading control and transmitting control. A RAM 213 is used as a temporary storage area such as a main memory or a work area for the CPU 211. An HDD 214 stores image data and various programs.

An operation unit I/F 215 connects the control unit 210 to an operation unit 220. The operation unit 220 is provided with a liquid crystal display unit having a touch-panel function, a keyboard, and the like. Further, the MFP 101 is provided with a Web browser function described later. The Web browser of the MFP 101 analyzes an HTML file, which is screen information received from the Web server 102, and displays an operation screen on the operation unit 220 based on the analysis result.

A printer I/F 216 connects the control unit 210 to a printer 221. Image data to be printed by the printer 221 is transferred from the control unit 210 to the printer 221 via the printer I/F 216, and is printed on a recording medium such as paper by the printer 221. A scanner I/F 217 connects the control unit 210 to a scanner 222. The scanner 222 generates image data by reading an image on an original set on the scanner 222, and inputs the generated image data to the control unit 210 via the scanner I/F 217. A network I/F 218 connects the control unit 210 to the network 110, and transmits and receives information to/from an external apparatus on the network 110.

Next, the control configuration of the Web server 102 is described. A control unit 310 including a CPU 311 performs overall control of the operation of the Web server 102. Note that reference numeral 316 denotes a bus that connects blocks in the control unit 310. The CPU 311 reads out a control program stored in a ROM 312, and executes various control processing, such as reading control and transmitting control. A RAM 313 is used as a temporary storage area such as a main memory or a work area for the CPU 311. An HDD 314 stores image data and various programs. A network I/F 315 connects the control unit 310 to the network 110, and transmits and receives information to/from an external apparatus on the network 110.

Functional Configuration of Information Processing System

Figure 3:
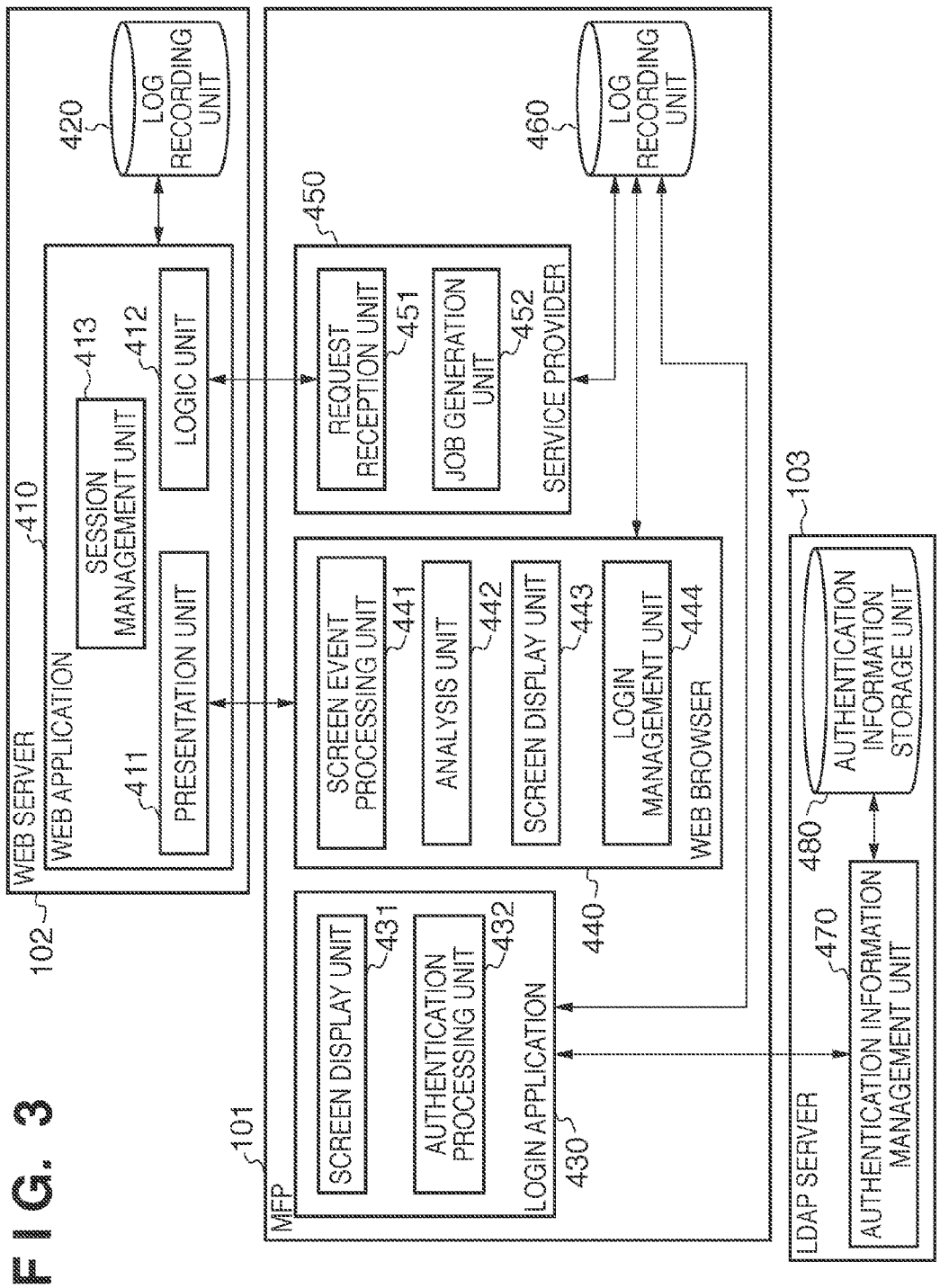
FIG. 3 is a diagram showing the functional configuration of the information processing system 100 according to the first embodiment.
Figure 4:
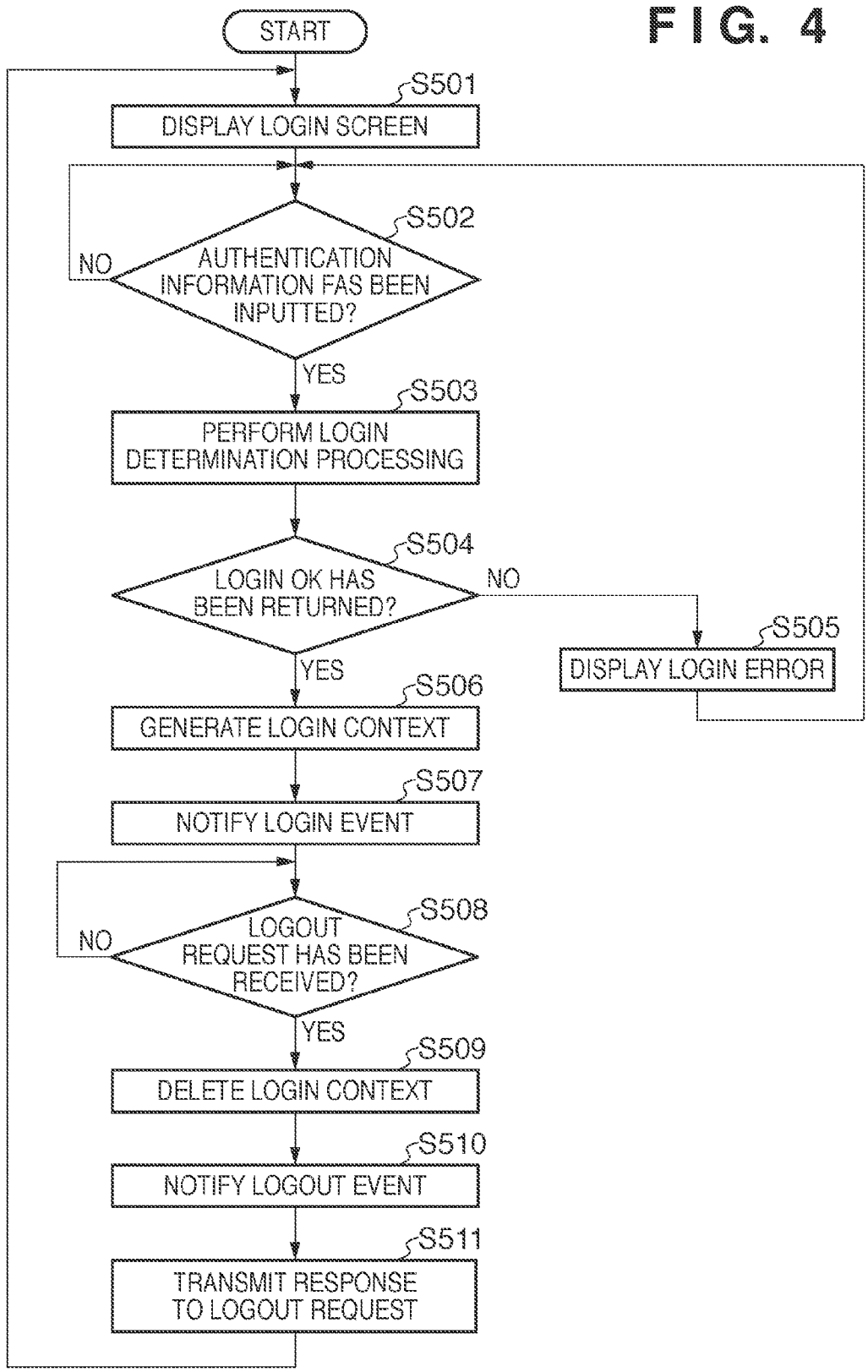
FIG. 4 is a flowchart showing a processing procedure performed by a login application 430 at the time of login, according to the first embodiment.

Next, the functional configuration of the information processing system 100 according to the present embodiment is described with reference to FIG. 3. The functional units shown in FIG. 3 are realized by the CPUs with which the MFP 101, the Web server 102, and the LDAP server 103 are respectively provided executing the control programs.

First, the functional configuration of the MFP 101 is described. The MFP 101 is provided with a login application 430, a Web browser 440, a service provider 450, and a log recording unit 460. The login application 430 includes a screen display unit 431 and an authentication processing unit 432. The screen display unit 431 displays, on the operation unit 220, an authentication screen for allowing a user to input authentication information necessary for authentication processing that is executed by the authentication processing unit 432. Note that this authentication screen is not provided by the Web server 102, but instead displayed by the login application 430 reading out information that is held in the MFP 101. The authentication processing unit 432 performs processing for logging into the MFP 101 using authentication information inputted via the authentication screen displayed by the screen display unit 431. Specifically, the authentication processing unit 432 transmits an inquiry to the LDAP server 103 about the inputted authentication information, and determines whether or not to execute login processing according to the inquiry result. Further, the login application 430 performs processing for logging out of the MFP 101 according to a logout request.

The Web browser 440 includes a screen event processing unit 441, an analysis unit 442, a screen display unit 443, and a login management unit 444. The screen event processing unit 441 detects a user operation performed with respect to a screen displayed by the screen display unit 443, and performs processing according to the operation content. Particularly, if an operation of issuing a request to a Web application 410 of the Web server 102 is performed, the screen event processing unit 441 communicates with a presentation unit 411 of the Web application 410 in accordance with the HTTP protocol. The analysis unit 442 analyzes an HTML file, which is screen information received from the Web application 410. This HTML file includes a description that indicates content of an operation screen to be displayed by the Web browser 440. The screen display unit 443 displays an operation screen on the operation unit 220 based on the result of analysis performed by the analysis unit 442. The login management unit 444 receives a notification of a login event or a logout event from the login application 430, and performs processing according to such a notification.

The service provider 450 includes a request reception unit 451 and a job generation unit 452. The request reception unit 451 receives a processing execution request from a logic unit 412 in the Web application 410, and delivers that processing execution request to the job generation unit 452. Further, the request reception unit 451 transmits a response to the logic unit 412 in the Web application 410 based on the execution result from the job generation unit 452. The job generation unit 452 generates and executes a job based on the processing execution request transmitted from the Web application 410. The result of job execution is recorded in the log recording unit 460. Note that the results of login and logout executed by the login application, a communication history with the Web server 102, and the like are also recorded in the log recording unit 460.

Next, the functional configuration of the Web server 102 is described. The Web server 102 includes the Web application 410 and a log recording unit 420. Furthermore, the Web application 410 includes the presentation unit 411, the logic unit 412, and a session management unit 413.

The presentation unit 411 communicates with the Web browser 440 with which the MFP 101 is provided. More specifically, the presentation unit 411 receives a request accompanied by a user instruction or the like from the Web browser 440 of the MFP 101, and causes the logic unit 412 to perform processing when necessary. Further, the presentation unit 411 generates screen information regarding an operation screen to be displayed by the Web browser 440 of the MFP 101 according to the request from the Web browser 440 of the MFP 101 or the result of processing performed by the logic unit 412, and transmits the screen information to the Web browser 440 of the MFP 101.

The logic unit 412 executes various processing according to the request received by the presentation unit 411, and also requests the service provider 450 of the MFP 101 to execute a function with which the MFP 101 is provided. Specifically, the logic unit 412 requests execution of print processing performed by the printer 221 of the MFP 101, execution of reading processing performed by the scanner 222, or execution of transmission processing performed via the network I/F 218. Note that such an execution request to the MFP 101 is issued through a connection that is different from that to the Web browser 440.

The session management unit 413 manages session information for temporarily saving states and data regarding communication with the Web browser 440 from when a menu screen request, which is a login request from the MFP 101, is issued until when a logout request is issued. Note that processing performed by the Web application 410, execution requests to the MFP 101 and the results of response thereto are recorded in the log recording unit 420.

Next, the functional configuration of the LDAP server 103 is described. The LDAP server 103 includes an authentication information management unit 470 and an authentication information storage unit 480. Authentication information corresponding to a user who is allowed to use the MFP 101 is stored in advance in the authentication information storage unit 480. The authentication information management unit 470 manages authentication information stored in the authentication information storage unit 480. Further, if an authentication inquiry is received from the login application 430 of the MFP 101, the authentication information management unit 470 verifies authentication information received due to that inquiry with authentication information stored in the authentication information storage unit 480. Then, the authentication information management unit 470 returns, to the login application 430, the result indicating whether or not authentication was successful according to the verification result.

Operation of Each Block at the Time of Login

Next is a description of processing performed by each functional block regarding the operation at the time of login in the information processing system 100 with reference to FIGS. 4 to 8. First, the operation of the login application 430 according to the present embodiment is described with reference to FIG. 4. Processing described below is realized by the CPU 211 of the MFP 101 executing the control program. Note that the login application 430 records information regarding processing in each step in the log recording unit 460, which is not shown in the flowchart. Further, the numbers following S described below indicate the step numbers of each processing.

In S501, the screen display unit 431 displays a login screen on the operation unit 220. FIG. 5 is a diagram showing an example of a login screen. The user inputs a user ID (identifier) in a user ID input field 602 in a login screen 601 and a password in a password input field 603 therein to log in, which is shown in FIG. 5.

In S502, the authentication processing unit 432 determines whether or not authentication information has been inputted via the login screen 601 from the user. Specifically, the authentication processing unit 432 determines whether or not an OK button 604 in the login screen 601 displayed by the screen display unit 431 has been pressed. If the OK button 604 has not been pressed, the authentication processing unit 432 waits until it is pressed, and if it has been pressed, the procedure proceeds to S503.

Subsequently, in S503, the authentication processing unit 432 performs login determination processing using the user ID and the password that have been inputted by the user. At this time, the authentication processing unit 432 transmits the user ID and the password that have been inputted by the user to the LDAP server 103, and issues a request for the result of login determination (user authentication). Note that the address of the LDAP server 103, which is the request destination, is set in advance. The LDAP server 103 receives the request from the authentication processing unit 432 with the authentication information management unit 470. After that, based on the received user ID, the authentication information management unit 470 verifies the password registered in advance in the authentication information storage unit 480 with the received password, and if they match, the authentication information management unit 470 returns "login OK" to the authentication processing unit 432, and if they do not match, the authentication information management unit 470 returns "login denied" thereto. Also, in the case where the received user ID is not registered in the authentication information storage unit 480, the authentication information management unit 470 returns "login denied" to the authentication processing unit 432. Note that the LDAP server 103, in addition to the above operation, may hold setting information and authority information unique to each user and the like, and may return "login OK" together with such information pieces to the authentication processing unit 432. The series of such operations performed by the LDAP server 103 is realized by the CPU 311 of the LDAP server 103 executing the control program.

Upon receipt of the response from the LDAP server 103, in S504, the authentication processing unit 432 determines whether or not "login OK" has been returned from the authentication information management unit 470. If "login OK" is returned, the procedure proceeds to S506, and if it is not (in the case of "login denied"), the procedure proceeds to S505. S505, the screen display unit 431 displays a login error screen 701 to which a message 702 indicating a login error is appended on the operation unit 220, which is as shown in FIG. 5, and the procedure returns to S502.

On the other hand, in S506, the login application 430 generates a login context corresponding to the user who has logged in. A login context is information indicating the user who has logged in, and includes the user ID that has been inputted in the login screen 601 and the login error screen 701 shown in FIG. 5. Further, a login context may include a session ID for uniquely identifying a date and time when the user logged in and a login session, in addition to the user ID. Further, in the case of receiving setting information unique to the user and the like from the LDAP server 103, such information may also be included.

Next, in S507, the login application 430 notifies the Web browser 440 that the user has logged in (a login event). Subsequently, in S508, the login application 430 determines whether or not a logout request has been received, and waits until receiving it. Upon receipt of a logout request, the procedure proceeds to S509.

Upon receipt of a logout request, in S509, the login application 430 deletes the login context generated in S506. Thereby, the user who logged in logs out. Subsequently, in S510, the login application 430 notifies the Web browser 440 that the user has logged out (a logout event). Then, in S511, the login application 430 transmits a response to the logout request indicating that logout processing has ended, and the procedure returns to S501, where the login application 430 displays the login screen 601 on the operation unit 220 of the MFP 101.

Figure 6:
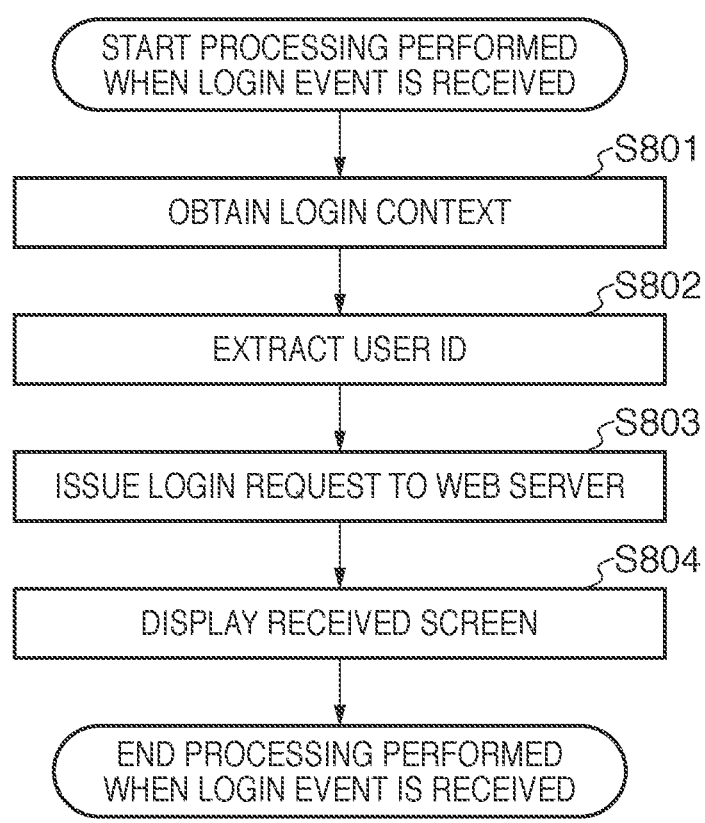
FIG. 6 is a flowchart showing a processing procedure performed by a Web browser 440 at the time of login, according to the first embodiment.

Next is a description of the operation of the Web browser 440 when a login event has been received with reference to FIG. 6. Processing described below is realized by the CPU 211 of the MFP 101 executing the control program. Note that the Web browser 440 records information regarding processing in each step in the log recording unit 460, which is not shown in the flowchart.

Upon receipt of a notification of a login event, in S801, the login management unit 444 obtains a login context from the login application 430. Then, in S802, the login management unit 444 extracts a user ID from the obtained login context and holds it. Subsequently, in S803, the login management unit 444 issues a login request to the Web application 410, in order to obtain a menu screen for operating the MFP 101 from the Web application 410 of the Web server 102. At this time, the user ID extracted in S802 is appended to this request, and the whole is transmitted. Note that the address of the Web server 102, which is the request destination, is stored in advance in the Web browser 440. Further, although the user ID is appended to the request here, the login context itself may be appended to the request without extracting the user ID, or the IP address of the MFP 101, which is the request source, and the like may also be appended to the request in addition to the user ID or the login context. Finally, in S804, the Web browser 440 analyzes screen information received as a response to the request issued in S803 with the analysis unit 442, and displays an operation screen on the operation unit 220 of the MFP 101 with the screen display unit 443.

Figure 7:
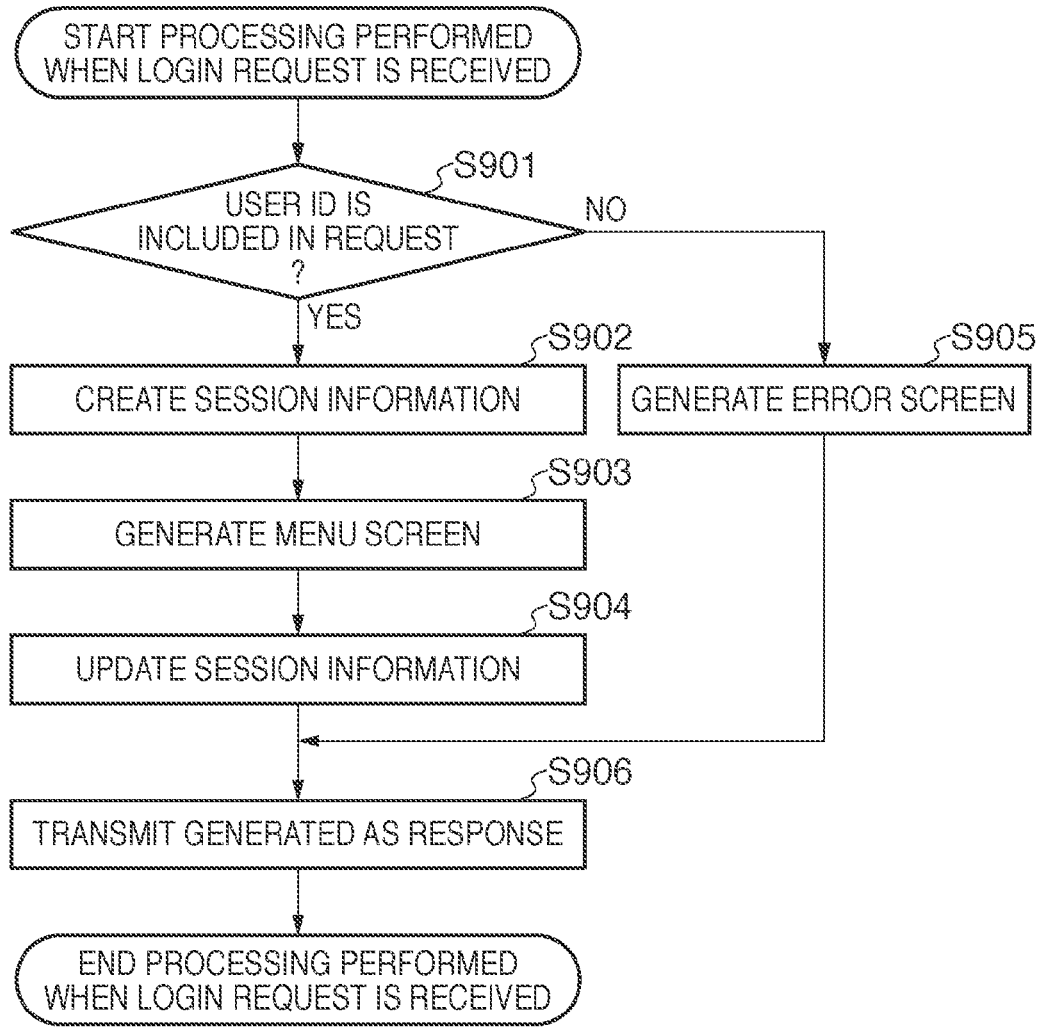
FIG. 7 is a flowchart showing a processing procedure performed by a Web application 410 at the time of login, according to the first embodiment.

Next is a description of the operation of the Web application 410 when a login request has been received with reference to FIG. 7. Processing described below is realized by the CPU 311 of the Web server 102 executing the control program. Note that the Web application 410 records information regarding processing in each step in the log recording unit 420, which is not shown in the flowchart.

In S901, the Web application 410 determines whether or not a user ID is included in the received request. If it is included, the procedure proceeds to S902, and if it is not included, the procedure proceeds to S905. In S902, the session management unit 413 generates session information with respect to connection from the user who has logged into the MFP 101. Session information includes a session ID and the user ID included in the received request, and further includes status information regarding the Web application 410, such as an ID of the operation screen that is displayed by the Web browser 440. Such information pieces are utilized to prevent receiving an invalid request and a repeated request. Session information is held in the session management unit 413 until receiving a logout request from the user having the user ID corresponding to the session information.

Subsequently, in S903, the presentation unit 411 generates information regarding the menu screen for operating the MFP 101. Here, the menu screen that will be displayed on the MFP 101 is described with reference to FIG. 8. In a menu screen 1001, buttons 1002 to 1005 are buttons respectively used for executing copy, transmission, scan, and printing functions with which the MFP 101 is provided. Further, reference numeral 1010 denotes a logout button used for ending a session with the Web application 410. After that, in S904, the session management unit 413 updates the status information included in the session information that is held using a screen ID of the generated screen information.

Figure 8:
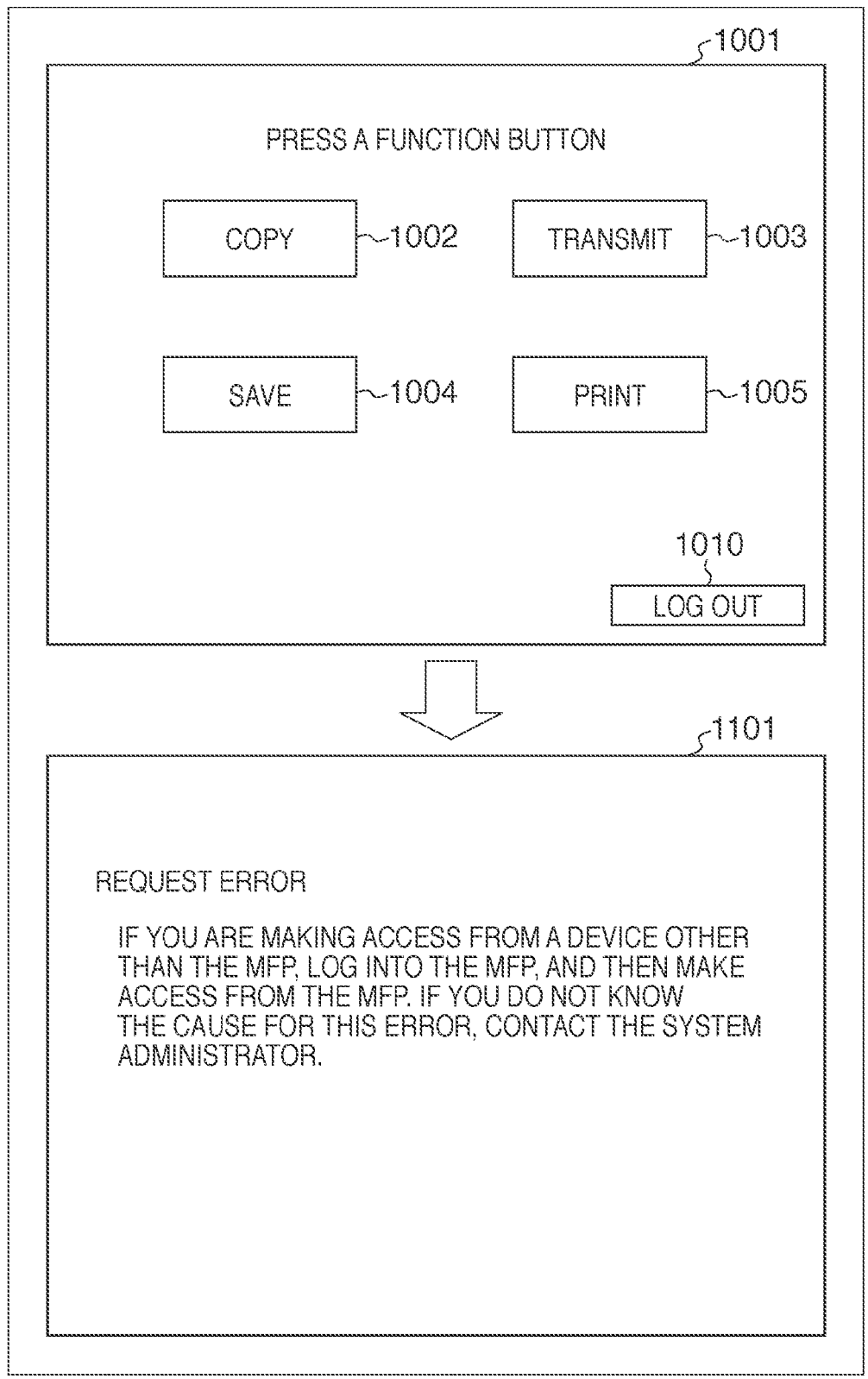
FIG. 8 is a diagram showing examples of a menu screen and an error screen according to the first embodiment.
Figure 9:
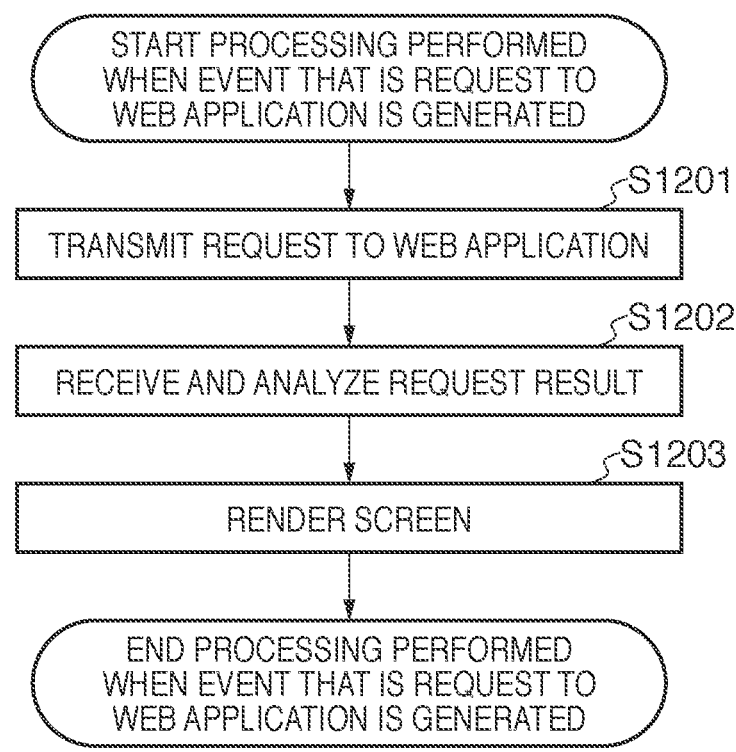
FIG. 9 is a flowchart showing a processing procedure performed by the Web browser 440 when an event is generated, according to the first embodiment.

On the other hand, if it is determined in S901 that a user ID is not included in the request, in S905, the presentation unit 411 generates screen information regarding an error screen 1101 for displaying that the received request is invalid. An example of the error screen 1101 is shown in FIG. 8. Thereby, a request from a user other than the user who has logged into the MFP 101 is refused.

After that, in S906, the presentation unit 411 transmits the screen information generated in S903 or S905 to the Web browser 440 as a response. The transmitted screen information will be displayed on the operation unit 220 of the MFP 101 by the Web browser 440.

Operation of Each Block when Event is Generated

Next is a description of the operation of the functional blocks in the information processing system 100 when an event that is a request to the Web application 410 is generated with reference to FIGS. 9 to 13. First, processing performed by the Web browser 440 when a request event is generated is described with reference to FIG. 9. Processing described below is realized by the CPU 211 of the MFP 101 executing the control program. Note that the Web browser 440 records information regarding processing in each step in the log recording unit 460, which is not shown in the flowchart. Here, an event that is a request to the Web application 410 (user instruction) is generated when the buttons 1002 to 1005 used for executing functions such as copy and transmission in the menu screen 1001, and the logout button 1010 therein are pressed by the user.

In S1201, the screen event processing unit 441 transmits a request to the Web application 410 according to the content of the button that was operated, for instance. Here, the screen event processing unit 441 is an example of an event notification unit. For example, if the transmission function button 1003 for utilizing the transmission function is pressed, a request for displaying a transmission function screen for executing the transmission function is transmitted. Further, if the logout button 1010 is pressed, a logout request for logging out is transmitted. Note that the user ID held by the login management unit 444 is appended to the request transmitted to the Web application 410 by the Web browser 440.

In S1202, the Web browser 440 receives a response to the transmitted request from the Web application 410, and analyzes the content with the analysis unit 442. Subsequently, in S1203, the Web browser 440 performs necessary processing based on the analysis result, and renders screen information received as a response on the operation unit 220 of the MFP 101 with the screen display unit 443.

Figure 10A:
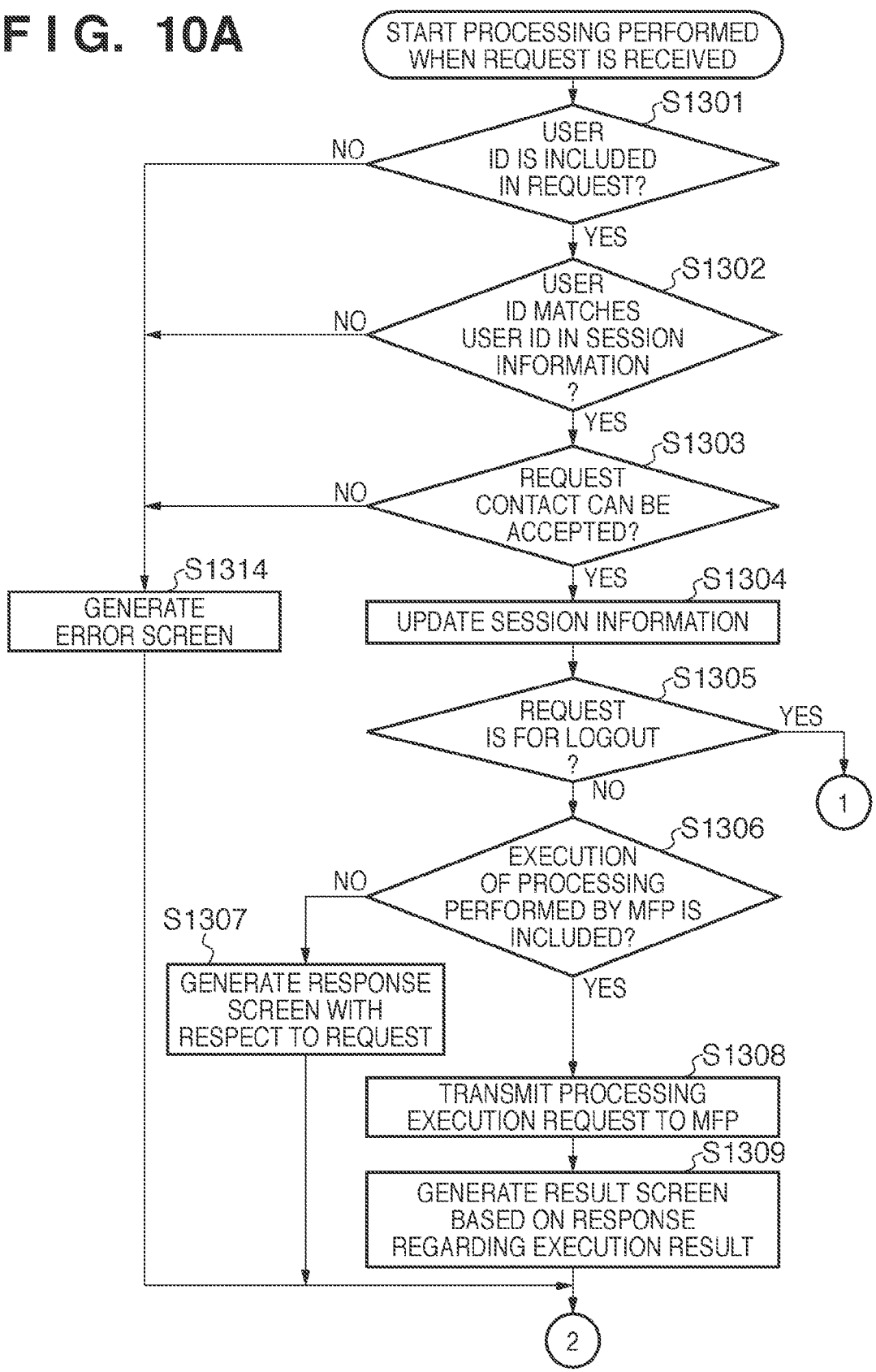

Next is a description of processing performed by the Web application 410 when the Web browser 440 transmits a request with reference to FIGS. 10A and 10B. Processing described below is realized by the CPU 311 of the Web server 102 executing the control program. Note that the Web application 410 records information regarding processing in each step in the log recording unit 420, which is not shown in the flowchart.

In S1301, the Web application 410 determines whether or not a user ID is included in the received request. If it is included, the procedure proceeds to S1302, and if it is not included, the procedure proceeds to S1314. In S1302, the Web application 410 determines whether or not the user ID included in the received request matches a user ID included in the session information held by the session management unit 413. If they match, the procedure proceeds to S1303, and if they do not match, the procedure proceeds to S1314.

In S1303, the Web application 410 determines whether or not the content of the received request can be accepted in the present status by referring to the status information included in the session information held by the session management unit 413. If it can be accepted, the procedure proceeds to S1304, and if it cannot be accepted, the procedure proceeds to S1314.

In S1304, the Web application 410 adds, to the status information in the session information held by the session management unit 413, information indicating that the request was accepted, together with the content of the request. Next, in S1305, the Web application 410 determines whether or not the received request is a logout request. This processing is an example of processing performed by a determination unit or a second determination unit. In the case of a logout request, the procedure proceeds to S1310, and in the case of a request other than a logout request, the procedure proceeds to S1306. For example, if a request has been issued by pressing the logout button 1010 in the menu screen 1001, a logout request is issued, and therefore the determination result here will be YES. If a request has been issued in the menu screen 1001 by pressing any of the buttons 1002 to 1005, instead of the logout button 1010, a request that is not a logout request is issued, and therefore the determination result here will be NO.

In S1306, the Web application 410 determines whether or not the received request includes execution of processing that is performed by the MFP 101. If processing that is performed by the MFP 101 is included, the procedure proceeds to S1308, and if it is not included, the procedure proceeds to S1307. For example, in the case of receiving a request issued by the transmission function button 1003 being pressed (request for displaying a transmission function screen) in the menu screen 1001, processing to be performed by the MFP 101 will not be executed yet, and therefore it is determined that the request does not include execution of processing that is performed by the MFP 101.

In S1307, the Web application 410 executes processing with the logic unit 412 according to the content of the request, and generates screen information regarding an operation screen with respect to the result of the request with the presentation unit 411. For example, in the case of receiving a request issued by the transmission function button 1003 being pressed (request for displaying a transmission function screen) in the menu screen 1001, a transmission function screen for inputting information necessary for executing the transmission function is generated.

Figure 11:
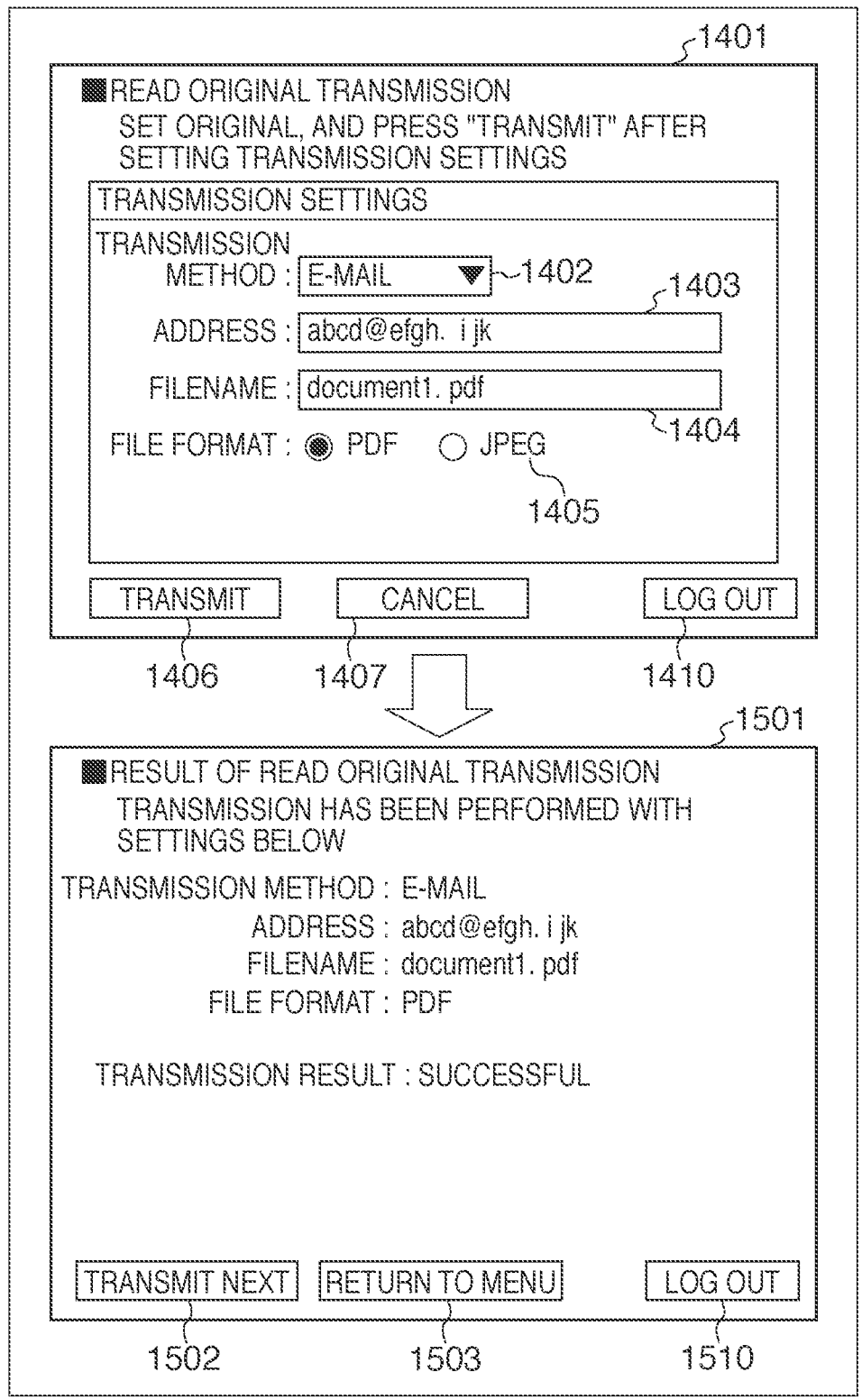
FIG. 11 is a diagram showing examples of a transmission function screen and an execution result screen according to the first embodiment.

Here, a transmission function screen 1401 is described with reference to FIG. 11. As shown in FIG. 11, in the transmission function screen 1401, the user can set a transmission method, a destination, a file format of the read image, and the like. A transmission method selection button 1402 is a drop-down button, with which electronic mail, FTP, FAX, and the like can be selected as the transmission method. "E-mail" is selected in the example in FIG. 11. A destination input form 1403 is a form for inputting information regarding a transmission destination, and an e-mail address is inputted in the example in FIG. 11. Note that if the transmission method is "FTP", a form for inputting information for logging into the transmission destination is displayed, in addition to the destination input form 1403 for inputting the address of a transmission destination server, and a path. Further, if the transmission method is "FAX", the FAX number of a transmission destination will be inputted in the destination input form 1403. A filename input form 1404 is a form for inputting a filename that is given to an image file that will be transmitted. The filename "document1.pdf" is inputted in the example in FIG. 11. A file format selection radio button 1405 is a radio button for selecting a file format in which the read image is transmitted. In the example in FIG. 11, PDF or JPEG can be selected, and PDF is selected. A transmission button 1406 is a button for starting processing in which an original set on the scanner 222 of the MFP 101 is read, and the read original is transmitted based on the transmission settings. If the transmission button 1406 is pressed, the Web browser 440 transmits, to the Web application 410, a request for starting execution of the transmission function (transmission function execution request) together with transmission setting information and the user ID. A cancel button 1407 is a button for canceling execution of the transmission function. If the cancel button 1407 is pressed, a request for displaying the original menu screen 1001 (menu screen display request) is transmitted together with the user ID to the Web application 410 of the Web server 102. A logout button 1410 is a button for logging out, and is equivalent to the logout button 1010 in the menu screen 1001.

Returning back to the description of FIGS. 10A and 10B, if it is determined in S1306 that execution of processing that is performed by the MFP 101 is included, in S1308, the Web application 410 transmits a processing execution request to the service provider 450 of the MFP 101 in accordance with the content of the request received from the Web browser 440. At this time, the Web application 410 appends the user ID included in the request from the Web browser 440 to the processing execution request. For example, in the case of receiving a request issued by the transmission button 1406 being pressed (request for executing the transmission function) in the transmission function screen 1401, here, a transmission function processing execution request is issued to the service provider 450.

In S1309, the Web application 410 receives a response to the processing execution request in S1308 from the service provider 450. Furthermore, the Web application 410 performs processing with the logic unit 412 according to the received content, and generates information regarding an execution result screen 1501 that is transmitted to the Web browser 440 with the presentation unit 411. FIG. 11 shows an example of the execution result screen 1501 when the transmission function is executed.

Further, if it is determined in S1305 that the request is for logout, in S1310, the Web application 410 transmits a logout processing execution request to the service provider 450 of the MFP 101. At this time, the Web application 410 appends the user ID included in the request from the Web browser 440 to the processing execution request. Subsequently, in S1311, the Web application 410 receives a response from the service provider 450. Upon receipt of the response, in S1312, the Web application 410 deletes the session information created in S902. Furthermore, in S1313, the Web application 410 generates information regarding a logout completion screen for notifying the user of completion of logout with the presentation unit 411, and the procedure proceeds to S1316.

As described above, if a user ID is not included in a request in S1301, if a user ID in session information and a user ID do not match in S1302, or if request content cannot be accepted in S1303, the procedure proceeds to S1314. In S1314, the Web application 410 generates screen information regarding the error screen 1101 shown in FIG. 8 with the presentation unit 411, and the procedure proceeds to S1315.

In S1315, the Web application 410 updates the status information included in the session information held by the session management unit 413 using the screen ID of the generated screen information. Here, the status information is updated using the screen ID of the screen information generated in S1307, S1309, or S1314. Subsequently, in S1316, the Web application 410 transmits the generated screen information to the Web browser 440 as a response. Here, the screen information generated in S1307, S1309, S1313, or S1314 is transmitted.

Figure 12:
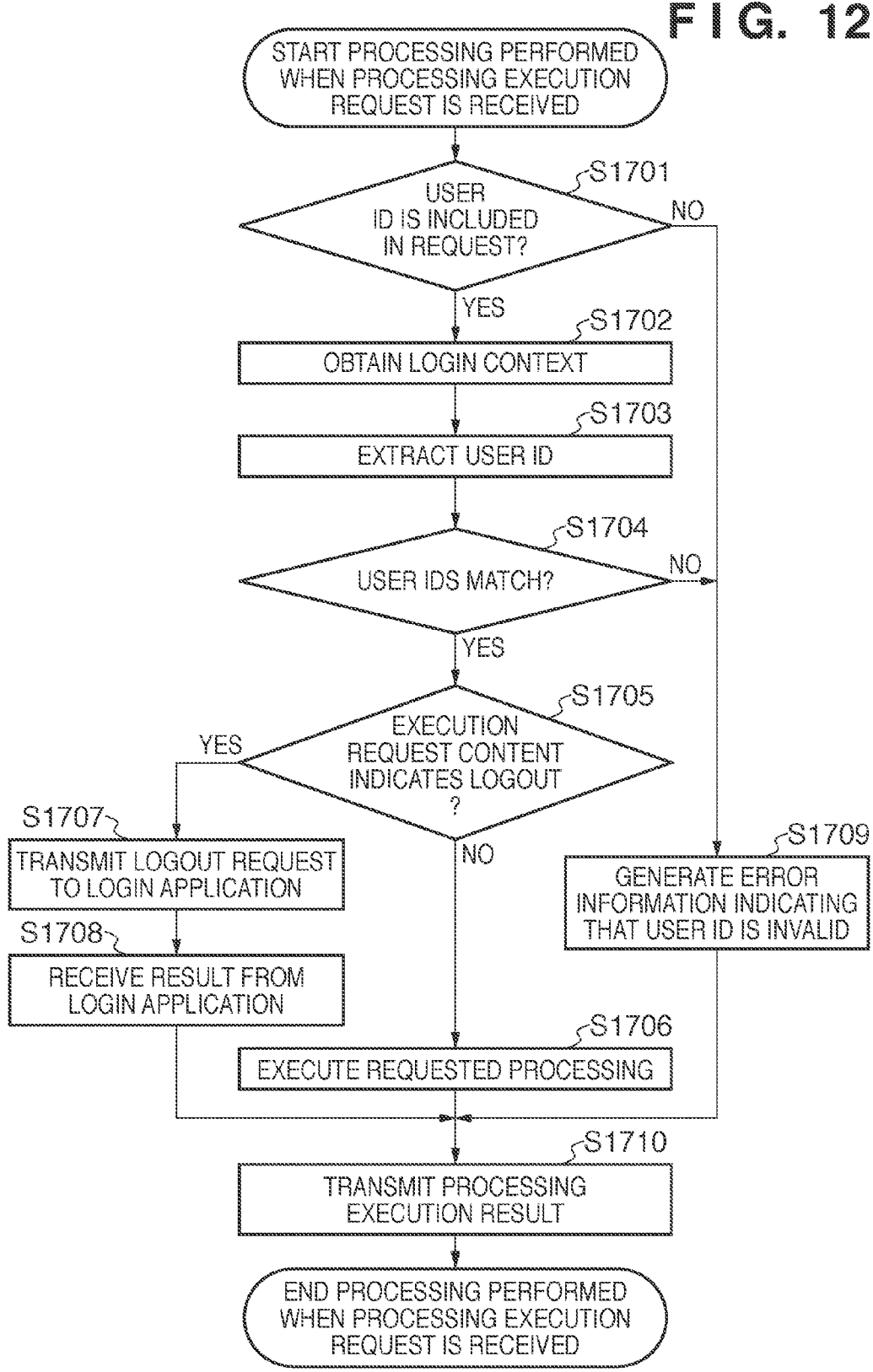
FIG. 12 is a flowchart showing a processing procedure performed by a service provider 450 when a processing execution request has been received, according to the first embodiment.

Next is a description of processing performed when the service provider 450 of the MFP 101 has received the processing execution request transmitted by the Web application 410 in S1308 or S1310 with reference to FIG. 12. Processing described below is realized by the CPU 211 of the MFP 101 executing the control program. Note that the service provider 450 records information regarding processing in each step in the log recording unit 460, which is not shown in the flowchart.

In S1701, the service provider 450 determines whether or not a user ID is included in the received processing execution request. If it is included, the procedure proceeds to S1702, and if it is not included, the procedure proceeds to S1709. In S1702, the service provider 450 obtains a login context generated by the login application 430. Then, in S1703, the service provider 450 extracts a user ID from the obtained login context.

Next, in S1704, the service provider 450 determines whether or not the user ID included in the received processing execution request and the user ID extracted in S1703 match. If the user IDs match, the procedure proceeds to S1705, and if they do not match, the procedure proceeds to S1709. In S1705, the service provider 450 determines whether or not the received processing execution request is for logout. If it is for logout, the procedure proceeds to S1707, and if it is not, the procedure proceeds to S1706.

If the processing execution request is not for logout, in S1706, the service provider 450 executes processing in accordance with the request content from the Web application 410. Then, in S1710, the service provider 450 transmits the processing execution result in S1706 to the Web application 410 as a response. On the other hand, if the processing execution request is for logout, in S1707, the service provider 450 transmits a logout request to the login application 430. Then, in S1708, the service provider 450 receives a response to the logout request, and transmits the received response, which is the processing result, to the Web application 410 in S1710 as a response.

In S1709, the service provider 450 generates error information indicating that user ID information is invalid as a processing execution result, and transmits the generated error information to the Web application 410 as a response in S1710. Thus, if a user ID is not included in S1701, or if user IDs do not match in S1704, the processing execution request is assumed to be an error request. Thereby, it is possible to prevent execution of a processing execution request from a user other than the user who is operating the Web browser 440 of the MFP 101.

Figure 13:
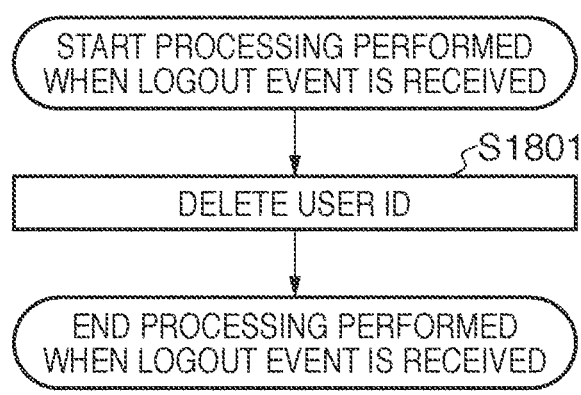
FIG. 13 is a flowchart showing a processing procedure performed by the Web browser 440 when a logout event has been received, according to the first embodiment.

Next is a description of processing performed by the Web browser 440 when a notification of a logout event has been received from the login application 430 with reference to FIG. 13. Processing described below is realized by the CPU 211 of the MFP 101 executing the control program. Note that the Web browser 440 records information regarding processing in each step in the log recording unit 460, which is not shown in the flowchart. In S1801, upon receipt of a notification of a logout event from the login application 430, the login management unit 444 of the Web browser 440 deletes the user ID that is being held, and ends the processing.

Next, flows of login processing, processing for executing the functions of the MFP, and logout processing are described, using examples of screens.

Login Processing

Next is a description of login processing according to the present embodiment using examples of screens displayed on the operation unit 220. First, in S501, the login application 430 displays the login screen 601 shown in FIG. 5 on the operation unit 220. In the login screen 601, the user has inputted "user001" as the user ID, and "password" (which is displayed as "********" for protection) as this user's password. Here, if the OK button 604 is pressed by the user, the result of the determination in S502 performed by the login application 430 is YES, and the authentication processing unit 432 performs login determination processing in S503. At this time, the user ID and the password that have been inputted are delivered to the LDAP server 103, and are verified with user authentication information that is held in the authentication information storage unit 480 by the LDAP server 103. If this result is "OK", a login context is generated in S506, and the login management unit 444 of the Web browser 440 is notified of a login event in S507. Upon receipt of the login event, the login management unit 444 of the Web browser 440 obtains in S801 the login context generated by the login application 430. Then, the login management unit 444 retrieves and holds the user ID "user001" in S802, and transmits a login request including the user ID "user001" to the Web application 410.

Upon receipt of the login request, first, the Web application 410 confirms in S901 whether or not a user ID is included in the request. Since the user ID "user001" is included in the received request, it is determined as being "YES" here. Next, in S902, session information is generated by the session management unit 413 as login processing that is performed by the Web application 410, and a session with "user001" is started. Furthermore, in S903, the presentation unit 411 generates screen information regarding the menu screen 1001. In S904, the status information included in the session information held by the session management unit 413 is updated using the screen ID of the generated screen information, and in S906, the generated screen information is transmitted to the Web browser 440 as a response. Here, in S804, the Web browser 440 analyzes the received screen information with the analysis unit 442, and displays the menu screen 1001 with the screen display unit 443.

Execution of Functions of MFP

Next is a description of execution of the functions of the MFP 101, using execution of the transmission function as an example after the above login processing ends and the menu screen 1001 is displayed. If the transmission function button 1003 in the menu screen 1001 is pressed by the user, in S1201, the Web browser 440 transmits a request for displaying a transmission function screen to the Web application 410. At this time, the user ID "user001" is included in that request.

Upon receipt of the request for displaying the transmission function screen, the Web application 410 makes determinations, the results of which are respectively "YES" in S1301, "YES" in S1302, and "YES" in S1303. Then, in S1304, the Web application 410 records information indicating that the request was received in the current status in the status information included in the session information held by the session management unit 413. The results of both of the determinations made in the following steps S1305 and S1306 are "NO", and in S1307, the presentation unit 411 generates information regarding the transmission function screen 1401 for allowing the user to set settings necessary for the transmission function and execute the transmission function. After that, in S1315, the status information included in the session information held by the session management unit 413 is updated using the screen ID of the generated screen information. Then, in S1316, the Web application 410 transmits the generated screen information to the Web browser 440 as a response. Here, the Web browser 440 receives and analyzes the response from the Web application 410 in S1202, and renders the transmission function screen 1401 in S1203.

After that, if the transmission button 1406 in the transmission function screen 1401 is pressed by the user, in S1201, the Web browser 440 transmits a request for executing the transmission function to the Web application 410. Here, values set in the transmission settings are included in the request for executing the transmission function, in addition to the user ID "user001". In the example in FIG. 11, "transmission method=e-mail", "destination=abcd@efgh.ijk", "filename=document1.pdf", and "file format=PDF" are included in the request as the transmission settings.

Upon receipt of the request for executing the transmission function, the Web application 410 performs processing in the order of S1301, S1302, S1303, S1304, and S1305, which is the same as when the request for displaying the transmission function screen has been received. However, in S1306, since the request is a request for execution performed by the MFP 101, the determination result is "YES". Then, in S1308, the Web application 410 transmits a transmission function processing execution request to the service provider 450 of the MFP 101. At this time, the user ID and the values of the transmission settings included in the request from the Web browser 440 are included in the processing execution request.

Upon receipt of the transmission function processing execution request, the service provider 450 makes a determination in S1701, the result of which is "YES", and obtains the login context from the login application 430 in S1702. Then, the service provider 450 obtains a user ID from the login context in S1703, and verifies it with the user ID included in the processing execution request in S1704. Here, since both of the user IDs are "user001", the determination result in S1704 is "YES". In the following step S1705, since the request is not a logout processing execution request, the determination result is "NO". Then, in S1706, the transmission function is executed based on the transmission settings included in the processing execution request. Specifically, the MFP 101 reads an original set on the scanner 222, and generates a PDF file having the name "document1.pdf". Then, the generated file is attached to an electronic mail addressed to the e-mail address "abcd@efgh.ijk", and the electronic mail is transmitted. Then, in S1710, the execution result is transmitted to the Web application 410 as a response.

In S1309, the Web application 410 receives the execution result of the transmission function processing execution request, and the presentation unit 411 generates information regarding the execution result screen 1501 for the transmission function according to the content. Furthermore, the Web application 410 updates in S1315 the status information included in the session information using the screen ID of the generated screen information, and transmits in S1316 the generated screen information to the Web browser 440 as a response. Here, the Web browser 440 analyzes the received information regarding the execution result screen 1501 for the transmission function in S1202, and displays it in S1203.

Logout Processing

Next is a description of logout processing, which is the feature of the present invention, using the case where the logout button 1010 in the menu screen 1001 is pressed as an example. Note that the same processing is also performed in the case where the logout button 1410 in the transmission function screen 1401 and a logout button 1510 in the execution result screen 1501 for the transmission function are pressed.

If the logout button 1010 in the menu screen 1001 is pressed by the user, in S1201, the Web browser 440 functions as an event notification unit, and transmits a logout request to the Web application 410. At this time, the user ID "user001" is included in this request. Upon receipt of the logout request, the Web application 410 performs processing in the order of S1301, S1302, and S1303, S1304, which is the same as the case when executing the functions of the MFP 101. However, in S1305, since the request is a logout request, the determination result is "YES". Then, in S1310, the Web application 410 functions as a logout notification unit, and transmits a logout processing execution request to the service provider 450 of the MFP 101. At this time, the user ID included in the request from the Web browser 440 is included in the processing execution request.

Upon receipt of the logout processing execution request, the service provider 450 performs processing in the order of S1701, S1702, S1703, and S1704, which is the same as the case when executing the functions of the MFP. However, in S1705, since the request is a logout processing execution request, the determination result is "YES". Then, in S1707, the service provider 450 issues a logout request to the login application 430. Upon receipt of the logout request, the login application 430 makes a determination in S508, the result of which is "YES", and deletes the login context in S509. Then, the login application 430 notifies the Web browser 440 of a logout event in S510. Upon receipt of the notification of the logout event, the login management unit 444 of the Web browser 440 deletes in S1801 the user ID that has been held. After that, the login application 430 transmits the processing result of the logout request to the service provider 450 as a response in S511, after which the procedure returns to S501, and the login screen 601 is displayed. The service provider 450 receives the processing result from the login application 430 in S1708, and in S1710, further transmits the received processing result to the Web application 410 as a result. Note that the processing in S1707 and S1708 described above is an example of processing performed by a first logout unit.

Upon receipt of the logout result from the service provider 450, the Web application 410 deletes in S1312 the session information held by the session management unit 413. Then, in S1313, the Web application 410 generates information regarding a logout completion screen, and transmits the screen information to the Web browser 440 in S1316. The Web browser 440 analyzes the received information regarding the logout completion screen in S1202, and displays it in S1203. Note that the state at this time is such that the procedure performed by the login application 430 has returned from S511 to S501, and the login screen 601 is already displayed on the operation unit 220 of the MFP 101. Note that the processing in S1310 to S1313 and S1316 described above is an example of processing performed by a second logout unit.

As described above, in the information processing system according to the present embodiment, the Web server is notified of a user instruction inputted via the operation screen of the Web browser provided from the Web server, as an event. Here, the Web server analyzes the notified event, and if this event is a logout request, the Web server executes processing for logging out of the Web server, and also notifies the MFP of the logout request. Upon receipt of the logout request from the Web server, the MFP executes processing for logging out of the MFP. Accordingly, in the present information processing system, both the Web server and the MFP execute logout processing by the user selecting the logout button, for instance, in the operation screen displayed by the Web browser. That is, the user can give an instruction to perform processing for logging out of both the Web server and the MFP at one time while maintaining the operational feel of the Web browser, and thus easily execute logout processing.

Second Embodiment

Figure 14A:
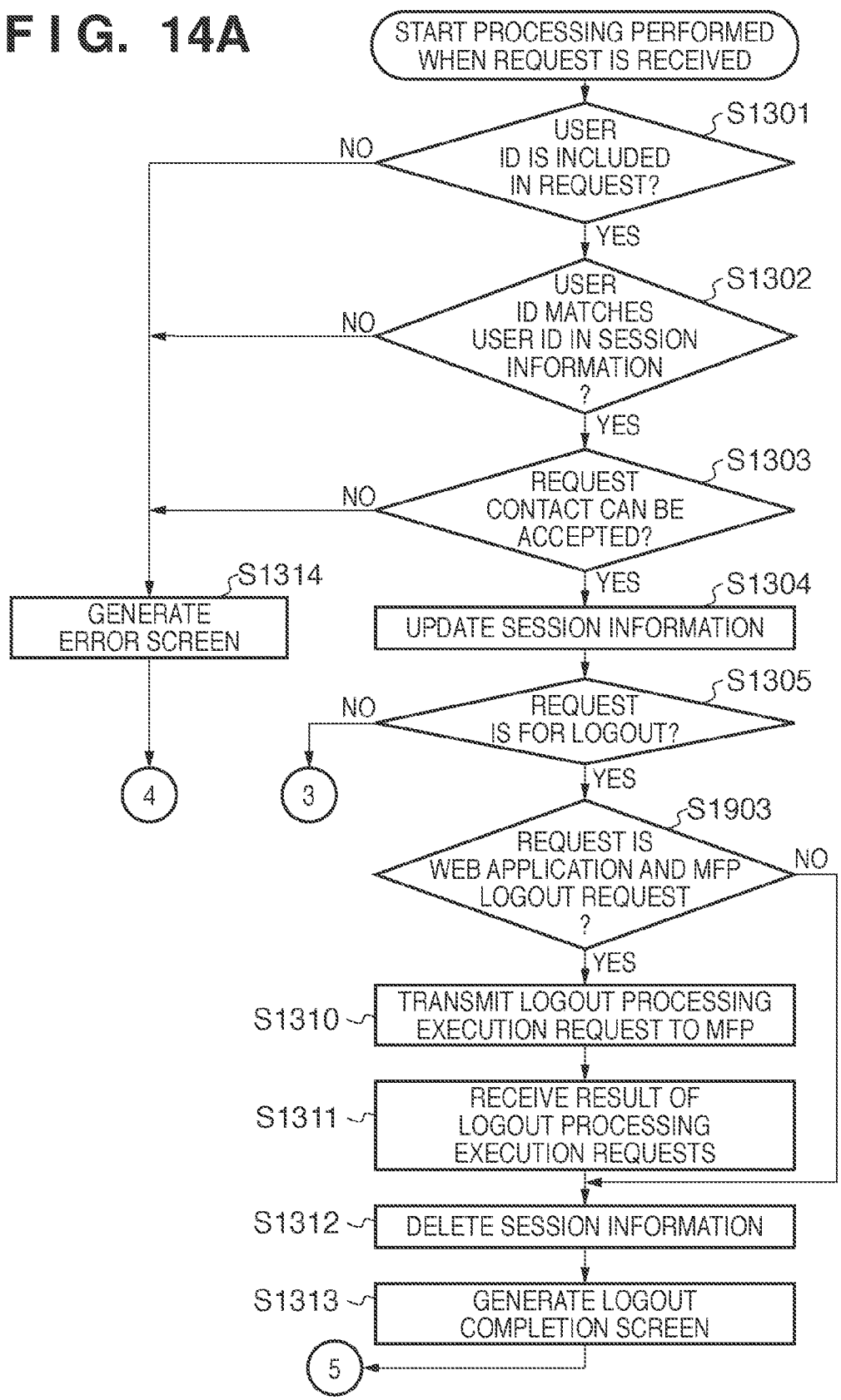
FIGS. 14A and 14B are a flowchart showing a processing procedure performed by the Web application 410 when an event is generated, according to a second embodiment.
Figure 14B:
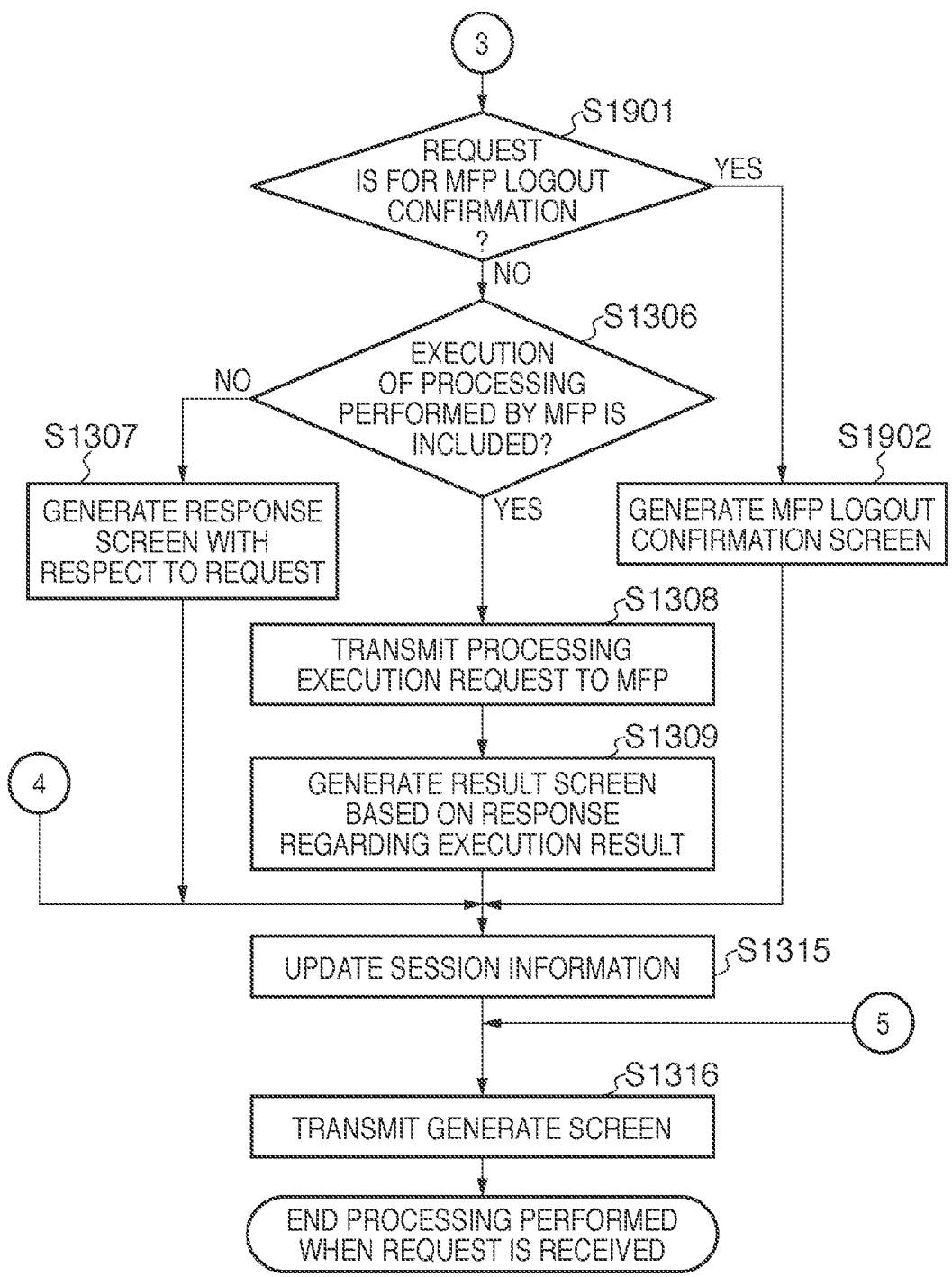

Next, a second embodiment is described. In the present embodiment, in addition to the configuration described in the first embodiment, when issuing a logout request to the Web application 410, the user confirms whether to also log out of the MFP 101. First, processing performed by the Web application 410 when a request transmitted by the Web browser 440 in S1201 has been received is described with reference to FIGS. 14A and 14B. Processing described below is realized by the CPU 311 of the Web server 102 executing the control program. Note that the Web application 410 records information regarding processing in each step in the log recording unit 420, which is not shown in the flowchart. Further, processing in S1301 to S1316 in FIGS. 14A and 14B are the same processing as that shown in FIGS. 10A and 10B, and thus a description thereof is omitted.

In S1901, the Web application 410 determines whether or not the received request is for MFP logout confirmation. In the first embodiment, if the logout button 1010, for instance, is pressed by the user, a logout request is issued to the Web application 410. However, in the present embodiment, this is an MFP logout confirmation request. If the received request is an MFP logout confirmation request, the procedure proceeds to S1902, and if it is not, the procedure proceeds to S1306.

In S1902, the Web application 410 generates screen information regarding an MFP logout confirmation screen 2001 with the presentation unit 411. An example of the MFP logout confirmation screen 2001 displayed by the Web browser 440 is shown in FIG. 15. The generated screen information is transmitted to the Web browser 440 in S1316, and is thereafter displayed by the Web browser 440. This processing is an example of processing performed by a screen information transmission unit. Then, in the MFP logout confirmation screen 2001 shown in FIG. 15, if the user presses a yes button 2002, a Web application and MFP logout request is transmitted to the Web application. On the other hand, if the user presses a no button 2003, a Web application logout request is transmitted to the Web application. The Web application 410 considers either of the requests as being a logout request, and thus the determination result in S1305 is YES, and the procedure proceeds to S1903.

In S1903, the Web application 410 determines whether or not the request is a Web application and MFP logout request. If the request is a Web application and MFP logout request, the procedure proceeds to S1310, and the same processing as that in the first embodiment is performed in the following steps, so as to log out of both the MFP 101 and the Web application 410. On the other hand, if the request is a request for logging out of the Web application 410, S1310 and S1311 are skipped, and only logout processing in the Web application (deletion of session information) is performed. Note that processing described above is an example of processing performed by a logout control unit.

As described above, in the information processing system according to the present embodiment, if an instruction for a logout request is given from the user, logging out of the Web server is performed, and at the same time, the user confirms whether or not to also log out of the MFP. Thereby, if a function that does not need the Web server is desired to be used in succession in the information processing apparatus, the time and effort for logging in again can be eliminated.

Third Embodiment

Next, a third embodiment is described. In the present embodiment, confirmation of whether or not to also log out of the MFP 101 described in the second embodiment can be set by user selection. Further, below is a description regarding only a configuration and a technique that are different from the above embodiments.

According to the present embodiment, in the authentication information storage unit 480 of the LDAP server 103, setting information (attribute information) regarding the operation at the time of logout is held in association with each user (identifier). There are three setting values, namely "Web application logout", "Web application and MFP logout", and "MFP logout confirmation". "Web application logout" indicates logging out of only the Web application and not logging out of the MFP when the user performs a logout operation. "Web application and MFP logout" indicates logging out of both the Web application and the MFP when the user performs a logout operation, which is the same as in the first embodiment. "MFP logout confirmation" indicates displaying the MFP logout confirmation screen 2001 when the user performs a logout operation, which is the same as in the second embodiment. Note that this setting value is delivered from the LDAP server 103 to the login application 430 when login determination processing is performed in S503, and is appended to a login context. Then, the setting value is extracted by the Web browser 440 together with the user ID in S802, and the setting value and the user ID are appended to a request to the Web application 410 and transmitted in S803. This processing is an example of processing performed by an attribute information transmission unit. Further, the Web application 410 that has received this request holds the setting value included in the request in session information in S902.

Next is a description of operation in the case where a logout operation is performed by the user with reference to FIGS. 16A and 16B. Processing described below is realized by the CPU 311 of the Web server 102 executing the control program. Note that the Web application 410 records information regarding processing in each step in the log recording unit 420, which is not shown in the flowchart. Note that processing in S1301 to S1316 in FIGS. 16A and 16B is the same processing as that shown in FIGS. 10A and 10B, and processing in S1901 to S1903 is the same processing as, that shown in FIGS. 14A and 14B, and thus a description thereof is omitted.

According to the present embodiment, if the logout button 1010, for instance, is pressed by the user, an MFP logout confirmation request is transmitted to the Web application 410, which is the same as in the second embodiment. If the Web application 410 receives this, the processing proceeds from S1901 to S2101. In S2101, the Web application 410 checks the setting value regarding the logout operation included in the session information. If this setting value indicates "MFP logout confirmation", the procedure proceeds to S1902, and the same processing as in the second embodiment is performed. On the other hand, if the setting value indicates "Web application logout", or "Web application and MFP logout", the procedure proceeds to S1903, and the same processing as in the second embodiment is performed. Note that the processing described above is an example of processing performed by the logout control unit.

As described above, in the information processing system according to the present embodiment, logging out of the Web server is performed, and at the same time, control is performed whether or not to log out of the MFP according to the attribute information. Thus, according to the present information processing system, by setting logout control when issuing a logout request in advance for each user, it is possible to eliminate the time and effort that is unnecessary for the user who does not need to confirm whether to log out of the information processing apparatus, for example.

Fourth Embodiment

Figure 17:
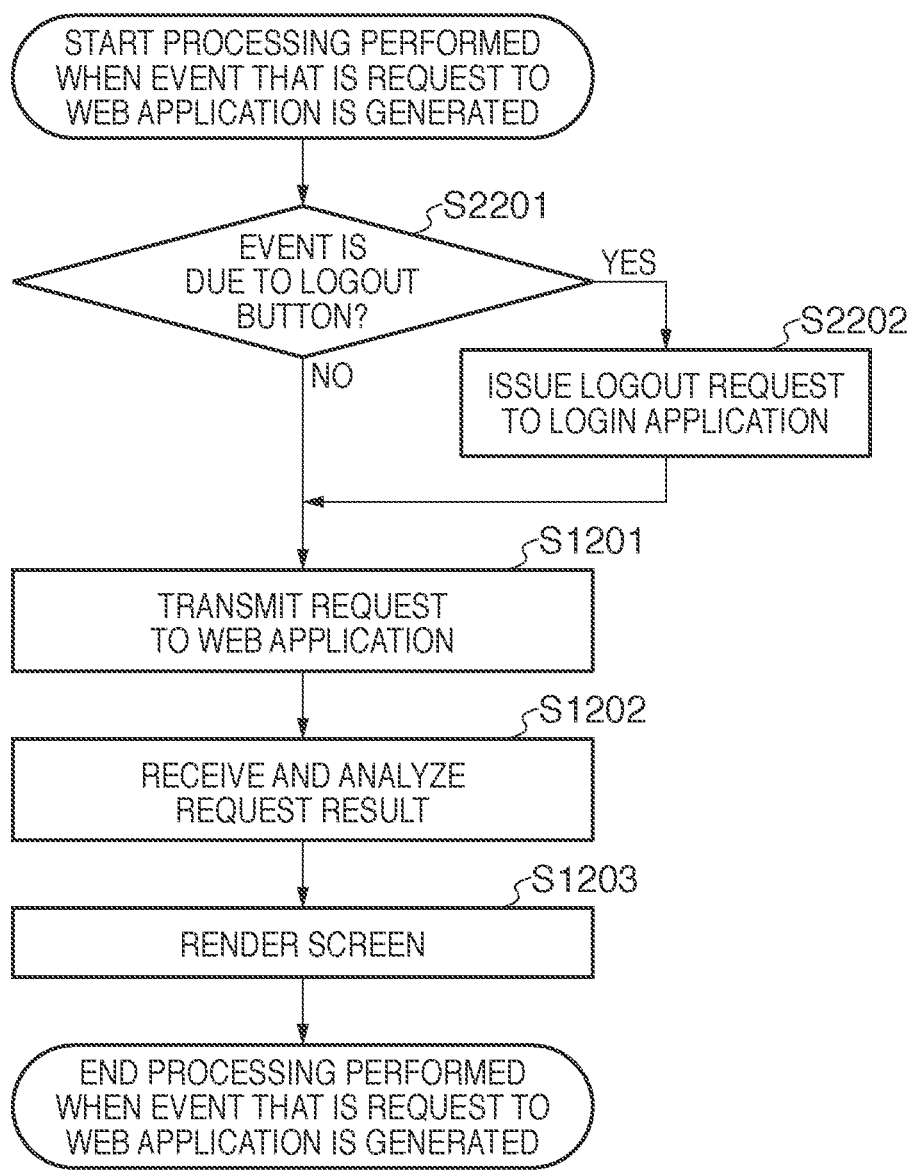
FIG. 17 is a flowchart showing a processing procedure performed by the Web browser 440 when an event is generated, according to a fourth embodiment.

Next, a fourth embodiment is described. Compared to the first embodiment, the present embodiment differs in that the Web browser 440 detects and performs processing on a logout request, and the Web application 410 does not issue a logout request to the service provider 450. First, a processing procedure performed by the Web browser 440 when an event that is a request to the Web application 410 is generated is described with reference to FIG. 17. Processing described below is realized by the CPU 211 of the MFP 101 executing the control program. Note that the Web browser 440 records information regarding processing in each step in the log recording unit 460, which is not shown in the flowchart. Further, processing in S1201 to S1203 shown in FIG. 17 is the same as the processing shown in FIG. 9, and thus a description thereof is omitted.

In S2201, the Web browser 440 determines whether the generated event is due to the logout button 1010, for instance, being pressed. Here, whether the logout button has been pressed is determined based on whether or not "Logout" is included as a name attribute value in form data transmitted as a request. Below, an example of an HTML description of the logout button for generating such information is shown.

```
<form method="POST" action="Logout.do">
    <input type="submit" name="Logout"
value="Logout">
</form>
```

Note that other than this, a determination may be made based on the name of a servlet or the like that is designated in "action" in the form. In the case of the event due to the logout button, the procedure proceeds to S2202. In the case of an event other than this, the procedure proceeds to S1201, and the same processing as in the first embodiment is performed. In S2202, the Web browser 440 issues a logout request to the login application 430. After that, the procedure proceeds to S1201, and the same processing as in the first embodiment is performed.

Next is a description of processing performed by the Web application 410 when the request transmitted by the Web browser 440 in S1201 has been received with reference to FIGS. 10A and 10B. In the present embodiment, processing in S1310 and S1311 is omitted from the flowchart shown in FIGS. 10A and 10B. Accordingly, a description of processing in the other steps is omitted.

If the determination result in S1305 is YES, the procedure proceeds to processing in S1312, without performing processing in S1310 and S1311, which is performed in the flowchart in FIGS. 10A and 10B. This is because in the present embodiment, the Web browser 440 detects a logout request and performs processing for logging out of the MFP 101, and thus a logout processing execution request from the Web application 410 to the service provider 450 is unnecessary. Accordingly, the Web application 410 will implement processing for logging out of the Web application 410, that is, immediately deleting session information, in S1312.

As described above, in the fourth embodiment, since the Web application 410 does not issue a logout processing execution request to the service provider 450, the time for communication can be saved. Accordingly, it is possible to realize logout processing that requires a shorter time.

Note that the present invention is not limited to the above-described embodiments, and various modifications are possible. For example, the present embodiment may be realized using a combination of the second and third embodiments. Here, the case where the present embodiment is applied to the second embodiment is described. In S2201 shown in FIG. 17, the Web browser 440 determines whether or not the event is an event in which a Web application and MFP logout request is generated. Note that this processing corresponds to processing in S2801 shown in FIG. 18 described later. Here, the Web browser 440 determines whether or not the event is an event in which a Web application and MFP logout request is generated based on whether or not "Logout_both" is included as a name attribute value in the transmitted form data. Below, an example of an HTML description of the logout button for generating such a request is shown.

```
<form method="POST" action="Logout.do">
    <input type="submit" name="Logout_both"
value="Yes">
    <input type="submit" name="Logout_app"
value="No">
</form>
```

The yes button 2002 in the MFP logout confirmation screen 2001 will be configured of such a description. Note that other than this, a determination may be made based on the name of a servlet or the like that is designated in "action" in the form. If the result of such a determination is YES, the procedure proceeds to S2202, and the same processing as in the present embodiment is performed. On the other hand, if the result of the determination is NO, the procedure proceeds to S1201, and processing is performed as a normal request event. In this case, it is possible to select whether or not to log out of the MFP 101 when use of the Web server 102 ends. Thereby, if a function that does not need the Web server 102 is desired to be used in succession in the MFP 101, the time and effort for logging in again can be eliminated.

On the other hand, the case where the present embodiment is applied to the third embodiment is described. In this case, the authentication information storage unit 480 of the LDAP server 103 holds setting information regarding the operation at the time of logout for each user, which is the same as in the third embodiment. Then, setting information regarding the operation at the time of logout is delivered from the LDAP server 103 to the login application 430, and is included in a login context when performing login determination processing in S503, which is the same as in the third embodiment. Furthermore, setting information regarding the operation at the time of logout is extracted and held by the login management unit 444 of the Web browser 440 together with the user ID in S802, and is included in a request to the Web application 410 and transmitted in S803. The Web application 410 that has received the request holds the setting value included in the request in session information in S902.

Figure 18:
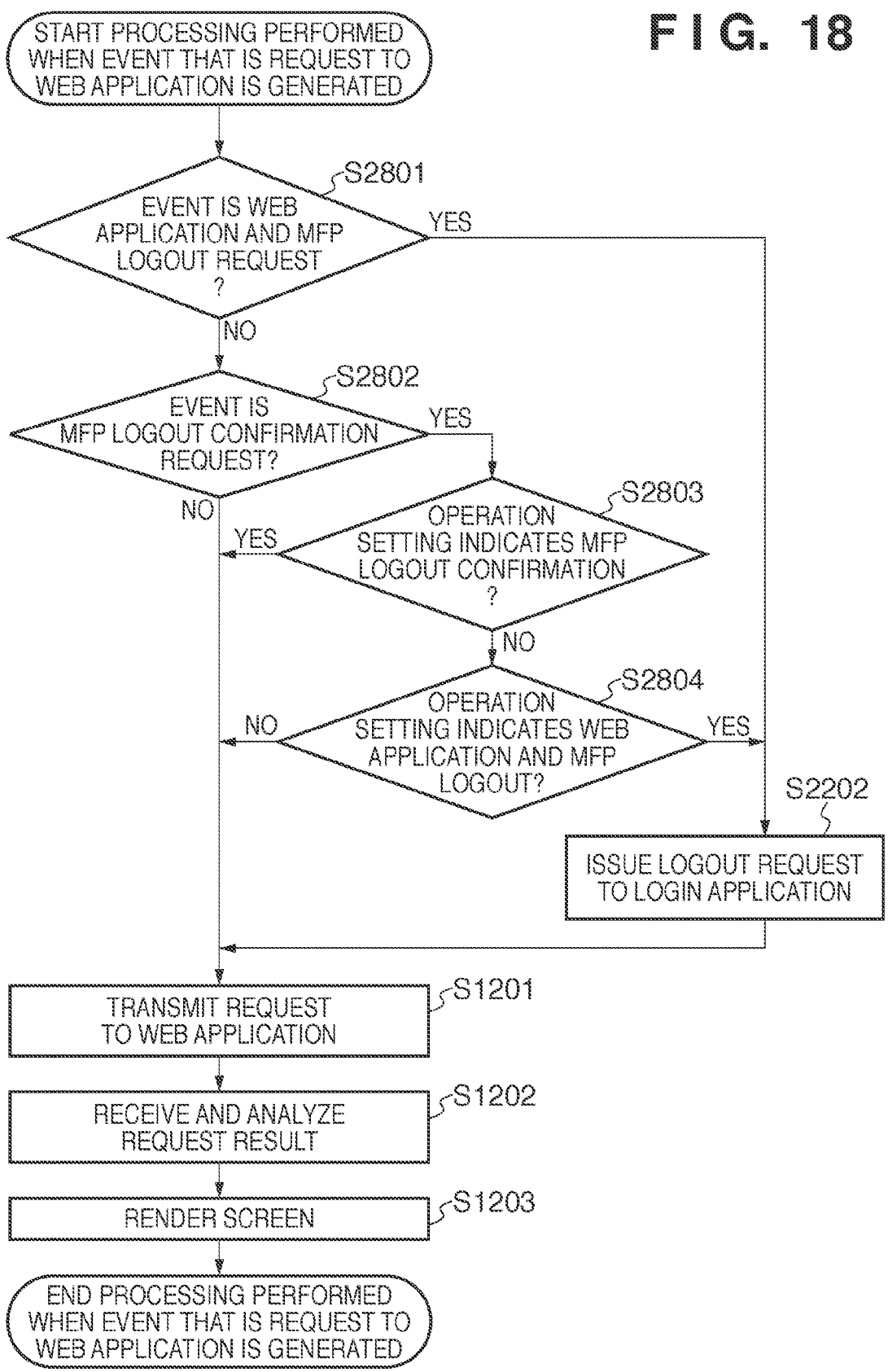
FIG. 18 is a flowchart showing a processing procedure performed by the Web browser 440 when an event is generated, according to a modified example of the fourth embodiment.

Here, a processing procedure performed by the Web browser 440 when an event that is a request to the Web application 410 is generated is described with reference to FIG. 18. Processing described below is realized by the CPU 211 of the MFP 101 executing the control program. Note that the Web browser 440 records information regarding processing in each step in the log recording unit 460, which is not shown in the flowchart. Further, in FIG. 18, S2801 to S2804 are added and S2201 is deleted from the flowchart shown in FIG. 17.

First, in S2801, the Web browser 440 determines whether or not the event is an event in which a Web application and MFP logout request is generated. Note that this determination is the same as the determination described above in the case of applying the present embodiment to the second embodiment. If the result of such a determination is NO, the procedure proceeds to S2802, and if the result is YES, the procedure proceeds to S2202, where a logout request is issued to the login application 430.

In S2802, the Web browser 440 determines whether or not the event is an event in which an MFP logout confirmation request is generated. Here, the Web browser 440 determines whether or not the event is an event in which an MFP logout confirmation request is generated based on whether or not "confirm_logout" is included as a name attribute value in the transmitted form data. Below, an example of an HTML description of the logout button for generating such information is shown.

```
<form method="POST" action="Logout.do">
    <input type="submit" name="confirm_logout"
value="Logout">
</form>
```

The logout button 1010 will be configured of such a description. Note that other than this, determination may be made based on the name of a servlet or the like that is designated in "action" in the form. If the result of such a determination is YES, the procedure proceeds to S2803, and if it is NO, the procedure proceeds to S1201, and processing is performed as a normal request event.

In S2803, setting information regarding the operation at the time of logout held by the login management unit 444 of the Web browser 440 is checked, and it is determined whether the setting value indicates "MFP logout confirmation". If the determination result is YES, the procedure proceeds to S1201, and processing is performed as a normal request event (MFP logout confirmation request). If the determination result is NO, the procedure proceeds to S2804.

In S2804, the setting information regarding the operation at the time of logout held by the login management unit 444 is checked again, and it is determined whether or not the setting value indicates "Web application and MFP logout". If the result of the determination is YES, the procedure proceeds to S2202, where a logout request is issued to the login application 430. If the result of the determination is NO, the procedure proceeds to S1201, and processing is performed as a normal request event (Web application logout request). Accordingly, if the present embodiment is applied to the third embodiment, it is possible to omit selection of whether or not to log out of the MFP 101 when use of the Web server 102 ends according to a setting value set by the user, and thus unnecessary time and effort can be eliminated for the user who does not need to perform confirmation.

Note that it is possible to make a determination of setting information regarding the operation at the time of logout in S2804 as follows. Specifically, the procedure is caused to proceed to S2202 if the determination result in S2803 is NO. Then, when a logout request is issued to the login application 430 in S2202, the login application 430 may perform determination in S2804, so as to determine whether or not to perform logout processing.

Fifth Embodiment

Next, a fifth embodiment is described. In the present embodiment, a logout processing execution request from the Web application 410 is not issued to the service provider 450, but instead an instruction for that request is given, the request being included in a response to a logout request to the Web browser 440. Furthermore, the Web browser 440 detects this instruction, and requests the login application 430 to log out of the MFP 101.

Figure 19:
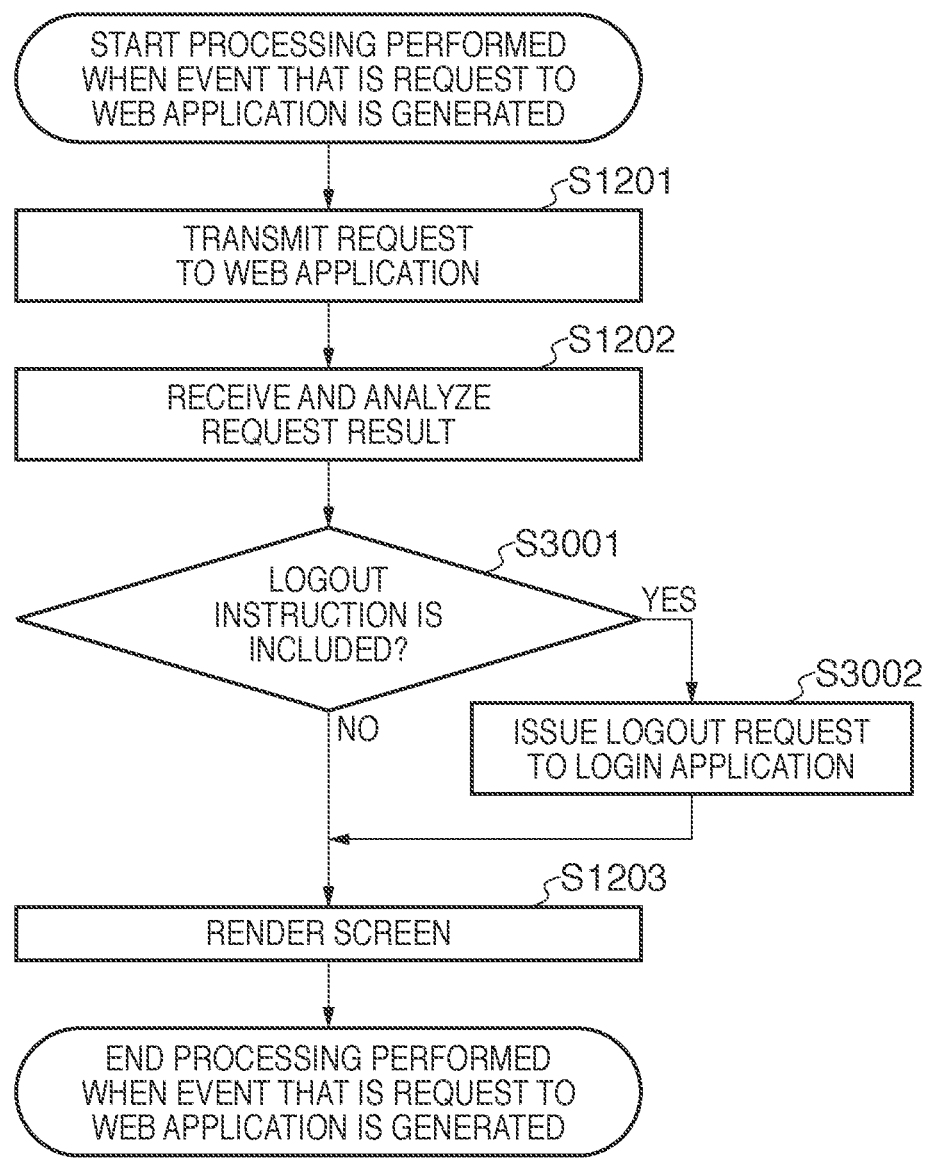
FIG. 19 is a flowchart showing a processing procedure performed by the Web browser 440 when an event is generated, according to a fifth embodiment.

With reference to FIG. 19, a processing procedure performed by the Web browser 440 when an event that is a request to the Web application 410 is generated is described. Processing described below is realized by the CPU 211 of the MFP 101 executing the control program. Note that the Web browser 440 records information regarding processing in each step in the log recording unit 460, which is not shown in the flowchart. Further, processing in S1201 to S1203 in FIG. 19 is the same as the processing shown in FIG. 9, and thus a description thereof is omitted.

In S3001, the Web browser 440 functions as a first determination unit, and determines whether or not a response from the Web application 410 includes a description of a logout processing execution request. Actually, detection of this description is performed in S1202. Below, an example of a description of this logout processing execution request is shown.

```
<head>
    <script type="text/mfpscript">
<!--
window.onload=function( ){
    logout( );}
//-->
    </script>
</head>
```

This description is described in a script language (for example, mfpscript) that can be interpreted by the Web browser 440 with which the MFP 101 is provided in a HEAD tag of an HTML file. The Web browser 440 reads the HTML file including this description and interprets the script, and when the logout( ) method is executed, the determination result in S3001 is YES. Note that rather than using such a description, detection may be performed by simply detecting a comment determined in advance or by designating a name determined in advance in a TITLE tag. If the determination result in S3001 is YES, the procedure proceeds to S3002, where the Web browser 440 issues a logout request to the login application 430, and thereafter the procedure proceeds to S1203. If the determination result in S3001 is NO, the procedure proceeds to S1203 as processing for a normal response.

Figure 20A:
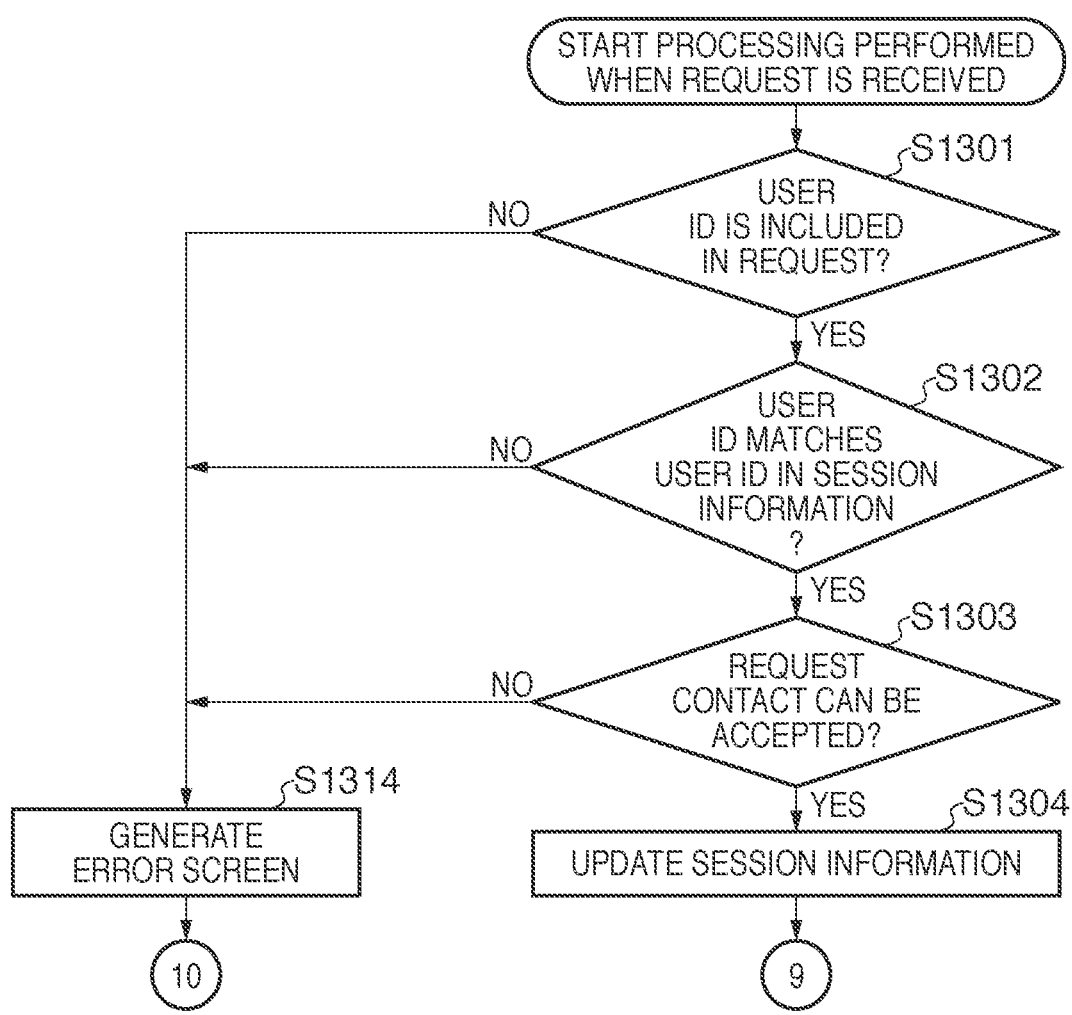
FIGS. 20A and 20B are a flowchart showing a processing procedure performed by the Web application 410 when an event is generated, according to the fifth embodiment.
Figure 20B:
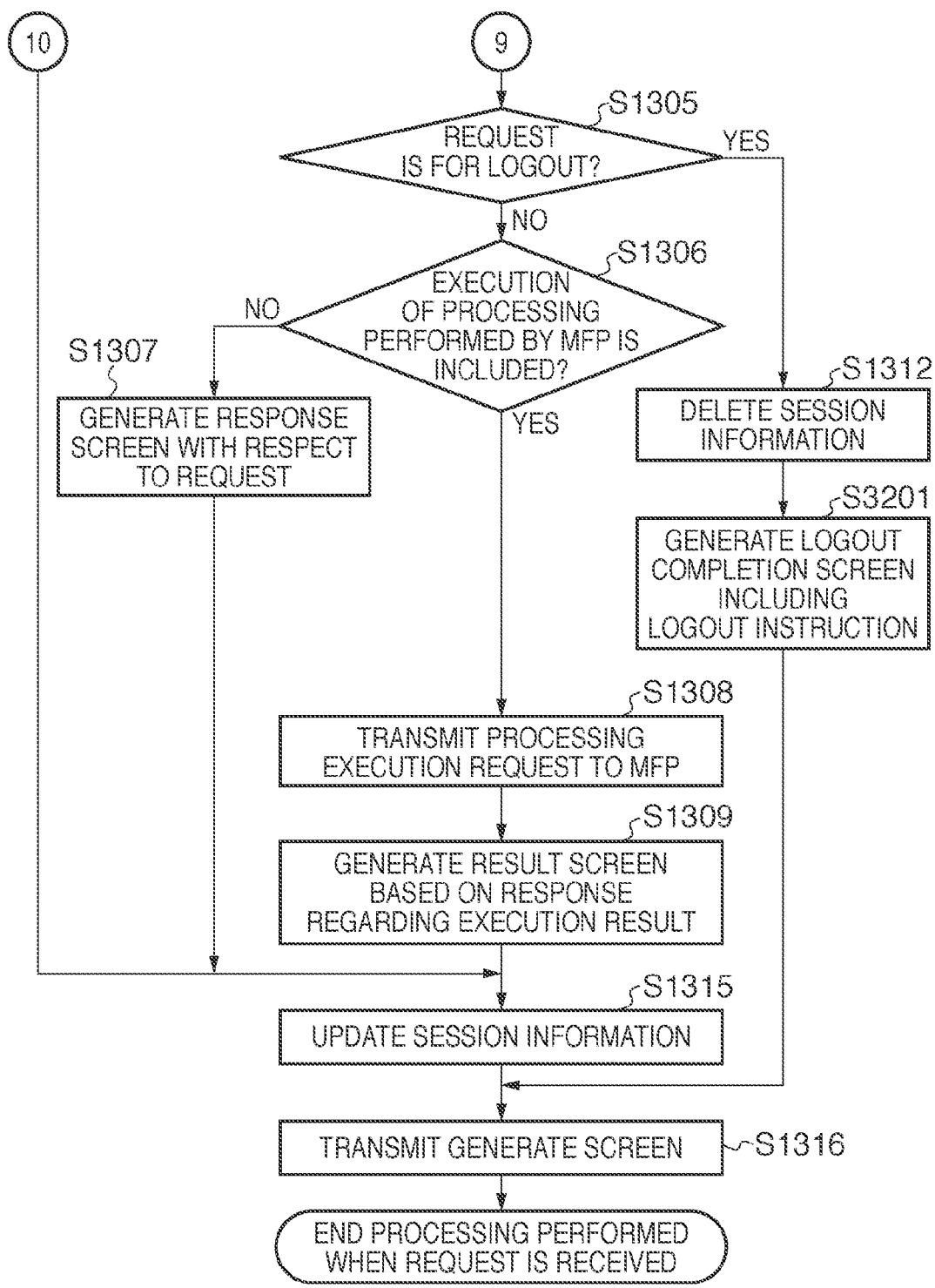

Next is a description of processing performed by the Web application 410 when a request transmitted by the Web browser 440 has been received with reference to FIGS. 20A and 20B. Processing described below is realized by the CPU 311 of the Web server 102 executing the control program. Note that the Web application 410 records information regarding processing in each step in the log recording unit 420, which is not shown in the flowchart. Further, in the flowchart in FIGS. 20A and 20B, S1310 and S1311 are deleted from the flowchart shown in FIGS. 10A and 10B, and S1313 is changed to S3201.

In S3201, the Web application 410 generates screen information regarding the logout completion screen, and also, adds, to that information, the above-described description of the logout processing execution request to the MFP. The information that has been thus generated is transmitted to the Web browser 440 as a response in S1316.

As described above, in the present embodiment, logging out of the Web application 410 is performed first. Accordingly, in addition to the effect of the fourth embodiment, it is possible to avoid session information being needlessly kept held in the Web application 410 due to a logout abnormality.

Figure 21A:
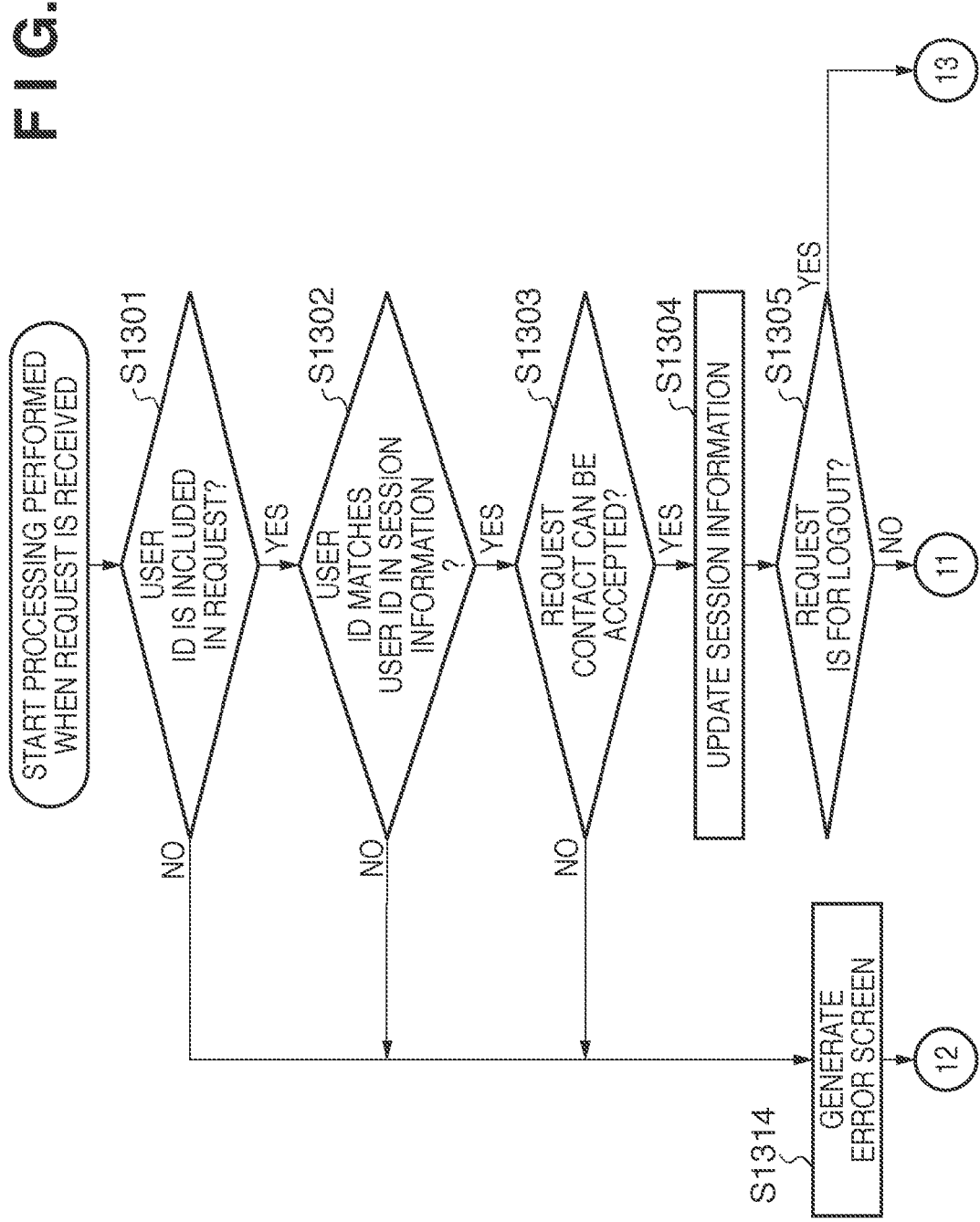

Note that the present invention is not limited to the above-described embodiments, and various modifications are possible. For example, the present embodiment may be realized using a combination of the second and third embodiments. Here, the case where the present embodiment is applied to the second embodiment is described. Processing performed by the Web application 410 when a request transmitted by the Web browser 440 in S1201 has been received is described with reference to FIGS. 21A and 21B. Processing described below is realized by the CPU 311 of the Web server 102 executing the control program. Note that the Web application 410 records information regarding processing in each step in the log recording unit 420, which is not shown in the flowchart. Further, processing in S1301 to S1316 and S3201 in FIGS. 21A and 21B is the same as the processing shown in FIGS. 20A and 20B, and thus a description thereof is omitted.

In S3301 after S1305, the Web application 410 determines whether or not the received request is for MFP logout confirmation. In the present embodiment, if the logout button 1010, for instance, is pressed by the user, an MFP logout confirmation request is issued from the Web browser 440, which is the same as processing shown in FIG. 17. If the received request is for MFP logout confirmation, the procedure proceeds to S3302, and if it is not, the procedure proceeds to S1306.

In S3302, the Web application 410 generates information regarding the MFP logout confirmation screen 2001 with the presentation unit 411. The generated screen information is transmitted to the Web browser 440 in S1316 and displayed. Then, if the yes button 2002 is pressed by the user in the MFP logout confirmation screen 2001, a Web application and MFP logout request is transmitted to the Web application 410. On the other hand, if the no button 2003 is pressed by the user, a Web application logout request is transmitted to the Web application 410. The Web application 410 considers any of these requests as being a logout request. Therefore, if such a request is received, the determination result in S1305 is YES, and the procedure proceeds to S1312. Then, in S1312, the Web application 410 performs logout processing (deletion of session information), and the procedure proceeds to S3303.

In S3303, the Web application 410 determines whether or not the logout request is a Web application and MFP logout request. If the request is a Web application and MFP logout request, the procedure proceeds to S3201, and an instruction to log out of the MFP is appended to the logout completion screen, and the resultant screen information is transmitted. Then, the logout instruction is interpreted in the MFP 101, and logging out of the MFP 101 is implemented. On the other hand, if the request is a Web application logout request, the procedure proceeds to S3304, where the Web application 410 generates only the screen information regarding the logout completion screen, and the Web application 410 transmits the generated screen information to the Web browser 440 as a response in S1316. Accordingly, in the case of a combination of the present embodiment and the second embodiment, it is possible to select whether or not to log out of the MFP 101 when use of the Web server 102 ends. Thereby, if a function that does not need the Web server 102 is desired to be used in succession in the MFP 101, the time and effort for logging in again can be eliminated.

Next, the case where the present embodiment is applied to the third embodiment is described. In this case, the authentication information storage unit 480 of the LDAP server 103 holds setting information regarding the operation at the time of logout for each user, which is the same as in the third embodiment. Then, when performing login determination processing in S503, the setting information regarding the operation at the time of logout is delivered from the LDAP server 103 to the login application 430, and is included in a login context, which is the same as in the third embodiment. Furthermore, the setting information regarding the operation at the time of logout is extracted and held by the login management unit 444 of the Web browser 440 together with the user ID in S802, and is included in a request to the Web application 410 and transmitted in S803. The Web application 410 that has received this request holds the setting value included in the request in session information in S902.

Next, the operation if a logout operation is performed by the user is described with reference to FIGS. 22A and 22B. Processing described below is realized by the CPU 311 of the Web server 102 executing the control program. Note that the Web application 410 records information regarding processing in each step in the log recording unit 420, which is not shown in the flowchart. Note that processing in S1301 to S1316, S3201, and S3301 to S3304 in FIGS. 22A and 22B is the same as processing in FIGS. 21A and 21B, and thus a description thereof is omitted.

If the logout button 1010, for instance, is pressed by the user, an MFP logout confirmation request is transmitted to the Web application 410. If the Web application 410 receives this, the processing is caused to transition from S3301 to S3401. In S3401, the Web application 410 checks the setting value for the operation at the time of logout included in the session information. Then, if the setting value indicates "MFP logout confirmation", the determination result here is YES, and the procedure proceeds to processing in S3302. On the other hand, if the setting value indicates "Web application logout" or "Web application and MFP logout", the determination result here is NO, and the procedure proceeds to processing in S1312. As described above, if the present embodiment is applied to the third embodiment, it is possible to omit selection of whether or not to log out of the MFP 101 when use of the Web server 102 ends, according to a setting value set by the user. Thereby, unnecessary time and effort can be eliminated for the user who does not need to perform confirmation.

Note that the MFP 101 may perform determination with respect to setting information indicating whether or not to display the MFP logout confirmation screen 2001, and whether or not to include a logout instruction to the MFP 101. In this case, for example, a script for determining a setting value and automatically issuing a request according thereto is embedded in the information regarding the MFP logout confirmation screen 2001, and the resultant information is returned to the Web browser 440. Then, the Web browser 440 interprets and executes the script, and if the setting value held by the login management unit 444 indicates "MFP logout confirmation", the Web browser 440 displays the MFP logout confirmation screen 2001 without performing any processing. On the other hand, in the case of a setting value other than that, logout may be realized by automatically issuing a Web application and MFP logout request or a Web application logout request according to the respective setting values.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-182894 filed on Aug. 5, 2009, which is hereby incorporated by reference herein in its entirety.

The invention claimed is:

1. An information processing apparatus communicating with a Web server, said apparatus comprising:
   a login unit configured to allow a user to log in to the information processing apparatus;
   a transmitting unit configured to transmit a login request for an application of the Web server to the Web server;
   a first receiver configured to receive screen data from the Web server provided by the application of the Web server;
   a display unit configured to display an operation screen based on the screen data, wherein the operation screen includes a logout key;
   a determination unit configured to determine whether the logout key of the operation screen is operated by a user; and
   a control unit configured to transmit a request for logging out from the application of the Web server to the Web server, and log out from the information processing apparatus, in a case where the determination unit determines that the logout key of the operation screen is operated by the user.

2. The information processing apparatus according to claim 1, wherein said display unit displays the operation screen by means of a Web browser.

3. The information processing apparatus according to claim 1, further comprising a second receiver configured to receive a request for controlling a scanning unit,
   wherein said scanning unit scans an original and outputs image data in response to the received request for controlling said scanning unit.

4. The information processing apparatus according to claim 1, wherein said logout unit is further configured to delete a login context indicating that the user logged into the information processing apparatus, by executing processing for logging out.

5. The information processing apparatus according to claim 1, further comprises a selecting unit configured to cause the user to select whether to execute a logout processing of the information processing apparatus in a case where the logout key of the operation screen is operated by the user.

6. The apparatus according to claims 1, wherein the operation screen is a screen for performing a function provided in the information processing apparatus.

7. A non-transitory computer-readable storage medium storing a computer program that when executed causes an information processing apparatus communicating with a Web server to perform a control method of the information processing apparatus, said control method comprising:
   logging in to the information processing apparatus;
   transmitting a login request for an application of the Web server to the Web server;
   receiving screen data from the Web server provided by the application of the Web server;
   displaying an operation screen based on the screen data, wherein the operation screen includes a logout key;
   determining whether the logout key of the operation screen is operated by a user; and
   transmitting a request for logging out from the application of the Web server to the Web server, and logging out from the information processing apparatus, in a case where it is determined that the logout key of the operation screen is operated by the user.

* * * * *